(12) United States Patent
Delury et al.

(10) Patent No.: US 9,488,425 B2
(45) Date of Patent: Nov. 8, 2016

(54) BELT FEED MECHANISM FOR MIL-SPEC LINKED AMMO

(71) Applicant: Slide Fire Solutions, LP, Moran, TX (US)

(72) Inventors: George Delury, North Ridgeville, OH (US); Jeremiah Cottle, Moran, TX (US)

(73) Assignee: Slide Fire Solutions LP, Moran, TX (US)

( * ) Notice: Subject to any disclaimer, the term of this patent is extended or adjusted under 35 U.S.C. 154(b) by 0 days.

(21) Appl. No.: 14/443,195

(22) PCT Filed: Nov. 14, 2013

(86) PCT No.: PCT/US2013/069963
§ 371 (c)(1),
(2) Date: May 15, 2015

(87) PCT Pub. No.: WO2014/120317
PCT Pub. Date: Aug. 7, 2014

(65) Prior Publication Data
US 2015/0300761 A1    Oct. 22, 2015

Related U.S. Application Data

(60) Provisional application No. 61/726,789, filed on Nov. 15, 2012.

(51) Int. Cl.
| | | |
|---|---|---|
| F41A 5/00 | (2006.01) | |
| F41A 9/29 | (2006.01) | |
| H04L 29/08 | (2006.01) | |
| G06Q 50/00 | (2012.01) | |

(52) U.S. Cl.
CPC .............. *F41A 9/29* (2013.01); *G06Q 50/01* (2013.01); *H04L 67/22* (2013.01); *H04L 67/306* (2013.01)

(58) Field of Classification Search
CPC .............. F41A 9/32; F41A 9/30; F41A 9/31; F41A 9/33; F41A 9/29
USPC ................................. 89/33.2, 33.25
See application file for complete search history.

(56) References Cited

U.S. PATENT DOCUMENTS

| | | |
|---|---|---|
| 2,032,376 A | 3/1936 | Moore |
| 2,090,656 A | 8/1937 | Williams |
| 2,173,837 A * | 9/1939 | Gorton .................... F42B 39/08 89/33.2 |
| 2,383,487 A | 8/1945 | Johnson, Jr |
| 2,390,477 A | 12/1945 | Trotter |
| 2,401,909 A | 6/1946 | Carlzen |
| 2,476,232 A | 7/1949 | Williams |

(Continued)

*Primary Examiner* — Samir Abdosh
(74) *Attorney, Agent, or Firm* — Endurance Law Group, PLC

(57) ABSTRACT

A lower-receiver type feeding device for belted ammunition cartridges. A lead cartridge of the belt is separated from its lead link at a central stripping station. A rocker-type transfer mechanism sequentially moves cartridges with connected link toward the central stripping station. The transfer mechanism is driven through a cam interface with the bolt-carrier group. A sheering lip is disposed at the central stripping station to engage the lead link directly below the lead cartridge and resist stripping forces when the lead cartridge is pushed through a first outlet for chambering. A mag well post slides into a magazine well of the firearm. A bolt catch extension is pivotally carried on the right pivot shaft to remotely activate the bolt catch. An end-of-link stop is joined to the end of the ammunition belt. The end-of-link stop comprised a dummy cartridge having a longitudinally extending groove.

19 Claims, 16 Drawing Sheets

(56) References Cited

U.S. PATENT DOCUMENTS

| | | | | |
|---|---|---|---|---|
| 2,644,365 A | | 7/1953 | Bernard | |
| 2,789,474 A | * | 4/1957 | Burns | F41A 9/31 89/33.25 |
| 2,792,761 A | | 5/1957 | Simpson | |
| 2,857,814 A | * | 10/1958 | Taylor | F41A 9/31 89/33.01 |
| 2,875,671 A | | 3/1959 | Robinson | |
| 2,903,809 A | | 9/1959 | Stoner | |
| 2,951,424 A | | 9/1960 | Stoner | |
| 2,979,992 A | * | 4/1961 | Colby | F41A 9/32 89/33.2 |
| 3,035,495 A | * | 5/1962 | Stoner | F41A 9/32 89/33.01 |
| 3,045,555 A | | 7/1962 | Stoner | |
| 3,087,270 A | | 4/1963 | Stoner | |
| 3,090,150 A | | 5/1963 | Stoner | |
| 3,293,986 A | | 12/1966 | Stoner | |
| 3,683,743 A | | 8/1972 | Stoner | |
| 3,713,363 A | | 1/1973 | Hurlemann | |
| 3,955,469 A | * | 5/1976 | Conley | F41A 9/33 89/33.14 |
| 3,960,053 A | * | 6/1976 | Conley | F41A 9/33 89/149 |
| 3,998,125 A | * | 12/1976 | Hartmann | F41A 9/30 89/33.25 |
| 4,119,012 A | * | 10/1978 | Frye | F41A 9/37 89/33.04 |
| 4,397,216 A | * | 8/1983 | Tassie | F41A 9/31 89/33.04 |
| 4,418,607 A | * | 12/1983 | Price | F41A 9/30 89/11 |
| 4,506,588 A | * | 3/1985 | Kazanjy | F41A 9/82 89/33.25 |
| 4,674,392 A | * | 6/1987 | Beckmann | F41A 9/37 198/367 |
| 4,765,224 A | | 8/1988 | Morris | |
| 4,942,802 A | | 7/1990 | Stoner | |
| 5,117,735 A | | 6/1992 | Flashkes | |
| 6,044,580 A | | 4/2000 | Gussalli Beretta | |
| 6,622,606 B1 | | 9/2003 | Neal | |
| 6,634,274 B1 | | 10/2003 | Herring | |
| 6,681,677 B2 | | 1/2004 | Herring | |
| 6,722,255 B2 | | 4/2004 | Herring | |
| 7,070,213 B2 | | 7/2006 | Willats et al. | |
| 7,258,055 B1 | | 8/2007 | Javorsky | |
| 7,428,795 B2 | | 9/2008 | Herring | |
| 7,934,443 B1 | | 5/2011 | Bennett | |
| 8,151,683 B2 | | 4/2012 | Dick et al. | |
| 8,869,672 B2 | * | 10/2014 | Smith | F41A 9/01 89/33.14 |
| 2012/0240911 A1 | | 9/2012 | Hu | |

* cited by examiner

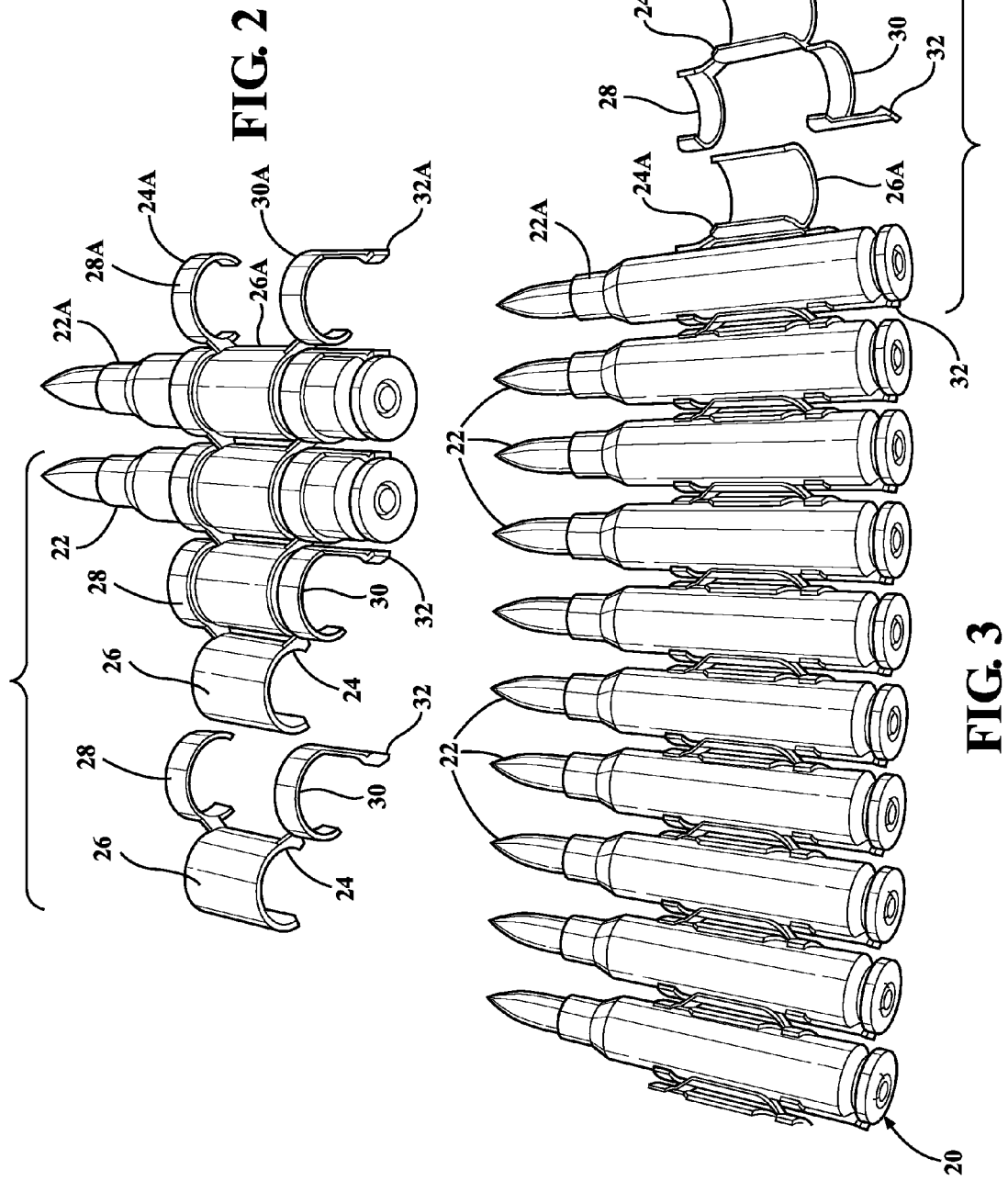

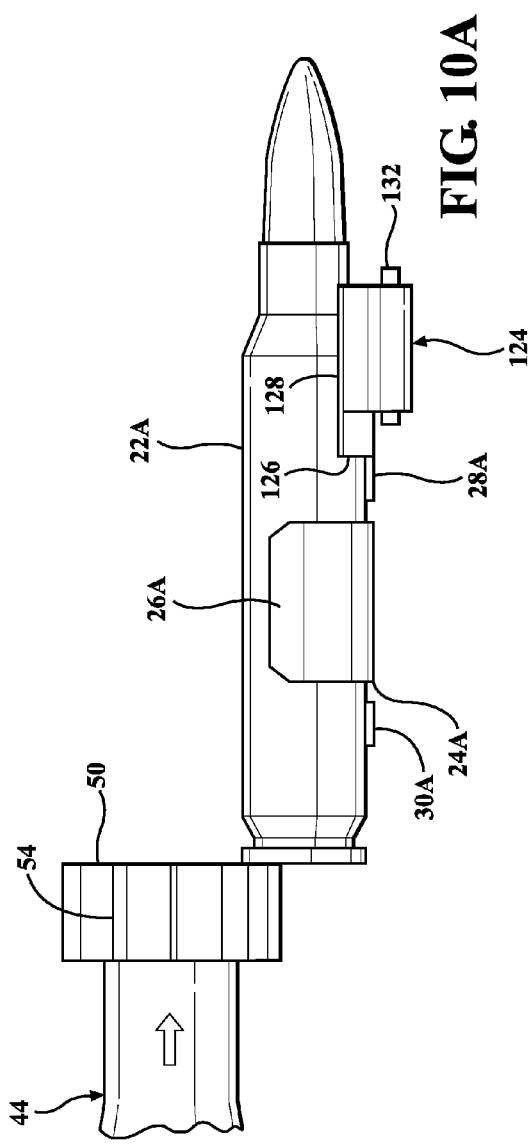
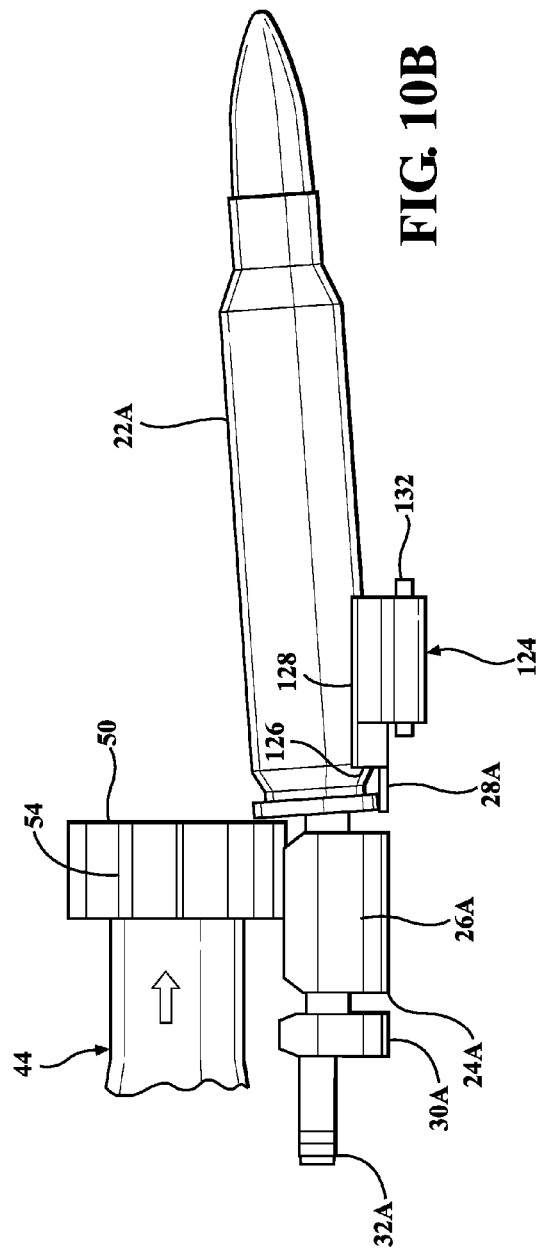

BELT FEED MECHANISM FOR MIL-SPEC LINKED AMMO

CROSS REFERENCE TO RELATED APPLICATIONS

This application claims priority to Provisional Patent Application No. 61/726,789 filed Nov. 15, 2012, the entire disclosure of which is hereby incorporated by reference and relied upon.

BACKGROUND OF THE INVENTION

1. Field of the Invention

The invention relates generally to an ammunition feeding device, and more particularly to such a device for feeding linked ammunition in timed sequence to the firing cycle of a self-loading firearm.

2. Description of Related Art

Firearms require a supply of ammunition. Small arms, including hand-carried rifles and pistols, often carry a small cache of ammunition in a magazine. Magazines are typically configured with an internal spring that helps move the top or lead cartridge stored in the magazine into a position where it may be loaded into the chamber by the action of the firearm. Many magazines hold between about 5-30 cartridges. Even when a magazine is configured to hold more than 30 cartridges, the limited number of available cartridges can be a drawback. Modern sporting rifles are capable of firing many rounds per minute, at which rates a magazine full of cartridges can be emptied in 2-3 seconds. There is a need in some situations to liberate a sporting rifle from the capacity limitations inherently imposed by standard magazines.

In addition to capacity limitations, traditional magazines can be cumbersome to load and unload. So-called "detachable" magazines, which are often regarded as more convenient than the "fixed" variety, are slow to load and can strain a user's thumbs when manually inserting one cartridge at a time. Various devices have been popularized to facilitate the magazine loading/unloading process, such as the popular Lula tool manufactured by maglula Ltd. of Rosh Ha'ayin Israel.

An alternative to magazine feed is belt feed. Belt feed systems overcome both the capacity limitation issues as well as the cumbersome loading/unloading issues of traditional magazines. Belt feed systems utilize ammunition cartridges that are linked together in a strip or so-called "belt". In order to utilize belted ammunition, the firearm must be equipped with a mechanism that will advance cartridges in the belt one-at-a-time into the receiver so that the lead cartridge in the belt is stripped from the belt in synchronized movement with the cyclic action of the firearm during its feeding and chambering processes. As can be appreciated, the belt feeding device must function in time with the firing cycle of the firearm so that miss-feeds, jams and damage do not result. Belt feed systems are usually driven from energy harvested from gas pressure of a preceding fired cartridge. Mechanical couplings with the bolt, bolt-carrier or other reciprocating features of an auto-loading firearm assure synchronization between the advancement of cartridges and the firing cycle of the firearm.

Modern ammunition belts often contain cartridges clipped together in a flexible chain using metal links. These are sometimes referred to as disintegrating link ammunition because the lead link of the belt becomes disassociated from the remainder of the belt when the lead cartridge is stripped away. Examples of disintegrating link ammunition belts are generally shown at 20 in FIGS. 1 and 2. Cartridges in the belt 20 are indicated by reference number 22, except that features of the lead cartridge are identified by the given reference number with added suffix "A". Links in the belt 20 are indicated by reference number 24, except that features of the lead link are identified by the given reference number with added suffix "A". Each link 24 is designed to nest with the next adjacent link 24 while simultaneously gripping two adjacent cartridges 22.

Each link 24 includes a large central loop 26 formed as an open, or a semi-cylindrical, band dimensioned to fit snugly about the casing of a particular cartridge round 22. Front 28 and rear 30 loops flank the central loop 26 on opposite sides, both also formed as open, or semi-cylindrical, bands dimensioned to fit snugly about the casing of a next adjacent cartridge 22 and on opposite sides of the central loop of the next adjacent cartridge 22. The rear loop 30 includes a positioning finger 62 on one side which snaps into the extractor groove of the cartridge 22 to retain the cartridge 22 in proper feed alignment. The design of the link 24 permits a portion of the firearm bolt to ride through link loop openings and push cartridges 22 forward and out of the lead link 24A into the chamber for firing (as described subsequently in connection with FIGS. 10A and 10B).

Belt feed systems for the AR-15 platform, as one example, utilize highly customized upper receivers. This can be observed in firearms offered by the ARES Defense of Melbourne, Fla., as an example. In belt feed systems incorporated into the upper receiver, the bolt face encounters the lead round of ammunition 22A from below during the feeding and chambering processes. While effective in use, these prior art belt feed systems incorporated into the upper receiver preclude the use of standard replacement parts needed to maintain the upper receiver of the firearm.

For upper-receiver type belt feed systems for the AR-15 platform, it should be observed that the ammunition is always fed from left to right (as viewed by a user shouldering the firearm) with the link loops 26, 28, 30 oriented over the top of the cartridge 22 casings Ammunition belts are loaded into a machine gun equipped with an upper receiver feed mechanism so that the open sides of the link loops 26, 28, 30 are down. (Like that shown in FIG. 2.) Soldiers are sometimes taught to remember the phrase "keep the brass to the grass" to avoid loading a belt 20 upside down. As depicted in FIGS. 2 and 4, this universal feeding orientation for belted ammunition results in the leading end of the ammo belt 20 presenting empty front 28A and rear 30A loops of the lead link 24A. In use, disassociated links 24 exit the receiver through an ejection chute 34. See for example FIG. 4.

The fact that empty front 28A and rear 30A loops of the leading link 24A always extend beyond the lead cartridge 22A of the ammo belt 20 loaded in "brass to the grass" orientation (i.e., for an upper receiver type system) is significant. When the face of the firearm bolt strips the lead cartridge 22A during the feeding and chambering processes, tremendous pushing forces are created on the belt 20. Most prior art belt feed systems are designed so that the forward most edge of the front loop 28A of the leading link 24A is positioned directly against an inner wall 36 of the ejection chute 34. This condition is illustrated in FIG. 3. The forward most edge of the leading front loop 28A stabilizes the entire lead link 24A. The link 24 on the other side of the lead cartridge 22A is stabilized by the second-in-line cartridge 22. Thus, the forward most edge of the leading link 24A plays a crucial role in stabilizing the lead cartridge 22A as it is being fed and chambered by the bolt.

Belted ammunition 20 cannot be fed upside down into a traditional prior art upper-receiver type belt feed system. In the upside down condition, the bolt must encounter the lead cartridge 22A from above in order to strip it from the loop openings in the lead link 24A. Also, in the upside down condition an empty central loop 26A leads the ammo belt 20. (See FIG. 1.) The forward most edge of the central loop 26A cannot be used as a running surface against the inner wall 36 of the ejection chute 34 because in that case the chute 34 would not be wide enough to admit the remaining width of the lead link 24A (in particular its front loop 28A) after separating from the lead cartridge 22A.

In contrast, some prior art belt feed systems are integrated into the lower receivers. U.S. Pat. No. 3,035,495 to E. M. Stoner, granted May 22, 1962, discloses a belt feed system designed into the lower receiver portion of an AR-15 and capable of accommodating belted ammunition 20 fed upside down (i.e., like the orientation shown in FIGS. 3 and 5). In lower-receiver style belt feeding devices like this, the bolt face encounters the extractor rim of the lead cartridge 22A from above during the feeding and chambering processes, as typical with standard magazine feeding. Stoner accommodates the "upside down" orientation of the belted ammo 20 by incorporating a proprietary slot (not shown) in the central loop 26 of each link 24. A fin in the ejection chute 34 registers with the slot in the central loops 26 to resist stripping forces. Belt feed systems that are integrated into the lower receivers (i.e., operating on the 1962 E. M. Stoner design depicted in U.S. Pat. No. 3,035,495) are disfavored due to the required use of non-mil spec links. Such non-standard links preclude the easy acquisition of belted ammunition on the open market, and are more expensive to manufacture than traditional military-style links 24.

There is therefore a need in the art for an improved belt feeding device that is integrated into the lower receiver but does not require proprietary linked ammunition and that attains the robust operating performance of an upper-receiver type feeding device.

BRIEF SUMMARY OF THE INVENTION

A feeding device for ammunition cartridges connected together in an elongated belt by separable links wherein the firearm individually separates a lead cartridge and a lead link from the remainder of the ammunition belt prior to chambering the lead cartridge in a breach. The device comprises a feed chute defining a transverse feed path configured to receive the ammunition belt with lead cartridge and connected lead link through an inlet. The feed chute further includes a central stripping station disposed along the transverse feed path. A first outlet is provided for discharging the lead cartridge after it has been separated from the lead link. A second outlet is provided for discharging the lead link after it has been separated from the lead cartridge. A transfer mechanism is operatively associated with the feed chute for sequentially moving the lead cartridge and its connected lead link into the central stripping station. The improvement comprises a sheering lip disposed in the central stripping station. The sheering lip is configured to engage a portion of the lead link directly below the lead cartridge to resist separating forces when the lead cartridge is pushed through the first outlet. Placement of the sheering lip directly below the lead cartridge minimizes the torsional stresses that are induced into the ammunition belt by the harsh stripping forces.

The present invention enables a lower-receiver style feeding device to achieve the advantages of the prior art upper-receiver style feeding devices while eliminating the traditional disadvantages of the prior art lower-receiver style feeding devices. The sheering lip of this invention is disposed to engage the lead link directly below the lead cartridge when the lead cartridge is moved into the central stripping station. By locating the sheering lip directly below the lead cartridge, forces imposed on the lead cartridge during the Feeding and Chambering stages of the firing cycle are resisted in such a way that torsional stresses are minimized. As a result of reduced torsional forces, the cartridges push through their links more easily. Reduced torsional forces also means that the cartridges receive less abrasion and plastic deformation, thus making them better suited for re-loading. The sheering lip feature also results in a substantially lower likelihood of jams due to the reduced push-through resistance.

BRIEF DESCRIPTION OF THE SEVERAL VIEWS OF THE DRAWINGS

These and other features and advantages of the present invention will become more readily appreciated when considered in connection with the following detailed description and appended drawings, wherein:

FIG. 2 is a fragmentary perspective view of an ammunition belt inverted to the "brass to the grass" orientation so that its lead end appears at the right side of the image;

FIG. 3 is a perspective view of an ammunition belt in the "brass to the grass" orientation as it appears inside a firearm receiver with the lead cartridge being stripped from the lead link and the lead link being restrained against an inner wall of the ejection chute;

FIGS. 10A and 10B are simplified side views showing a bolt pushing the lead cartridge out of the lead link while the sheering lip provides a counter-resistive force against the lead link;

DETAILED DESCRIPTION OF THE INVENTION

Figure 1:
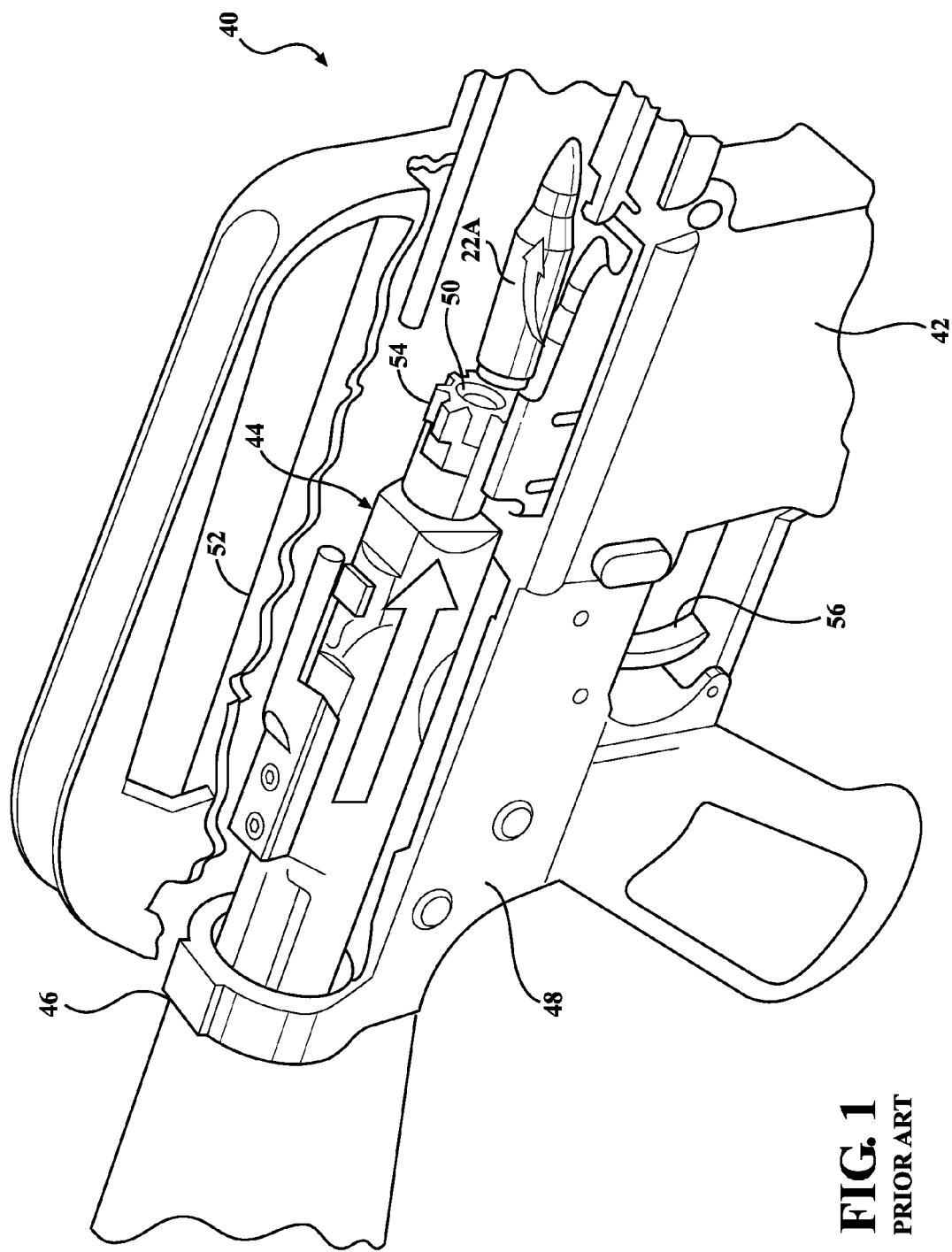
FIG. 1 is a fragmentary perspective view of an ammunition belt comprising a plurality of cartridges interconnected by links, with one link shown at the lead end disassociated from the belt.

The principles of this invention are adaptable to many different makes and models of firearms. One embodiment of the invention is configured specifically for use with an AR-15 style firearm, like that generally shown at 40 in FIGS. 4 and 5. The AR-15 platform is used herein for illustrative purposes only; it is to be understood that the invention may be practiced with other makes and models of firearms given corresponding modifications that will be apparent to an ordinarily skilled gunsmith.

The firing cycle of a typical magazine-fed AR-15 firearm 40 is described briefly in order to provide context for the exemplary belt-fed AR-platform application of this invention. After a loaded magazine (not shown) has been inserted into the magazine well 42 of the firearm 40, the eight cycles of functioning include: Feeding, Chambering, Locking, Firing, Unlocking, Extracting, Ejecting, and Cocking.

The Feeding process. As the bolt-carrier group 44 moves rearward, it engages the buffer assembly 46 and compresses its internal buffer spring (not shown) which in an AR-15 extends rearwardly from the lower receiver, generally indicated at 48. When the bolt-carrier group 44 clears the top of the magazine, the expansion of the magazine spring (not shown) forces the follower and a new lead cartridge 22A ascends into the path of the forward movement of the bolt face 50. This elevated feeding position of the lead cartridge 22A is referred to herein as a central stripping station. That is, the magazine spring together with the shape of the magazine hold the lead cartridge 22A is this central stripping station, which is an ideal location from while the bolt-carrier group 44 can engage the lead cartridge 22A. In this configuration, the expansion of the buffer spring next sends the bolt-carrier group 44 forward with enough force to strip the lead cartridge 22A from its central stripping station in the magazine.

The Chambering process. As the bolt-carrier group 44 continues to move forward, the face 50 of the bolt thrusts the lead cartridge 22A forwardly and upwardly into the chamber. At the same time, an extractor claw grips the rim of the cartridge 22A and the ejector is compressed.

The Locking process. As the bolt-carrier group 44 moves forward, a bolt cam pin riding in a guide channel in the upper receiver, generally indicated at 52, keeps the bolt in its most forward position. Just before the bolt locking lugs 54 make contact with the barrel extension (not shown), the bolt cam pin emerges from the guide channel. The pressure exerted by the contact of the bolt locking lugs 54 and barrel extension causes the bolt cam pin to move along a cam track (located in the bolt-carrier 44) in a counterclockwise direction, rotating the bolt locking lugs 54 in line behind the mating barrel extension locking lugs. The rifle 40 is ready to fire.

The Firing process. With a cartridge 22 in the chamber, the hammer cocked, and the selector in FIRE mode, the user squeezes the trigger 56. The trigger 56 rotates on a trigger pin, depressing the nose of the trigger and disengaging a notch on the bottom of the hammer. A hammer spring drives the disengaged hammer forward. The hammer strikes the head of the firing pin, driving the firing pin through the bolt and into the primer of the cartridge. The primer ignites, causing the powder in the cartridge 22A to ignite. The gas generated by the rapid burning of the powder forces the projectile from the cartridge and propels it through the barrel 58. After the projectile has passed a gas port (on AR-15 platforms located under the front sight) and before it leaves the barrel 58, gas enters the gas port and is routed into a gas tube. The gas tube directs the gas back into the bolt-carrier 44. It passes down through a key and into a space between the rear of the carrier 44's bolt cavity and the rear of the bolt itself. Then, the gas expands. The bolt is locked into the barrel extension, unable to move forward; the carrier 44 is forced to the rear by the expanding gas.

The Unlocking process. As the bolt-carrier 44 moves to the rear, the bolt cam pin follows the path of the cam track in the bolt-carrier 44. The cam pin and bolt assembly rotate simultaneously until the locking lugs 54 of the bolt are no longer in line behind the locking lugs of the barrel extension.

The Extracting process. The bolt-carrier group 44 continues to move to the rear. The extractor (which is attached to the bolt) grips the rim of the cartridge 22A case, holds it firmly against the face 50 of the bolt, and withdraws the cartridge 22A case from the chamber.

The Ejecting process. With the base of a cartridge 22A case firmly against the face 50 of the bolt, the ejector and ejector spring are compressed into the bolt body. As the rearward movement of the bolt-carrier group 44 allows the nose of the cartridge 22A case to clear the front of the ejection port, the cartridge 22A is pushed out by the action of the ejector and ejector spring.

The Cocking process. The rearward movement of the bolt-carrier 44 overrides the hammer. The hammer is forced down into the receiver, and the hammer spring is compressed. This action cocks the hammer in the firing position. The cycle repeats with the Feeding process.

Turning now to the present invention, a novel ammunition feeding device is generally shown at 60. The feeding device 60 is particularly adapted for ammunition cartridges connected together in an elongated belt 20 by separable links 24. The firearm 40 individually separates a lead cartridge 22A and a lead link 24A from the remainder of the ammunition belt 20 prior to chambering the lead cartridge 22A in a breach of the firearm 40. The feeding device 60 is thus of the type for sequentially presenting rounds of ammunition 22, 22A to separate from interconnecting links 24, 24A. The present invention is designed primarily to function with mil-spec open loop link types including, but not limited to, the M15A, M27 and M13 varieties, but also other disintegrating link types as well. The feeding device 60 is structurally and functionally similar in many respects to the lower receiver type belt feeding device described in U.S. Pat. No. 3,035,495 to E. M. Stoner, granted May 22, 1962, the entire disclosure of which is hereby incorporated by reference and relied upon. The reader is commended to U.S. Pat. No. 3,035,495 for an overall understanding of the placement and functioning of the present feeding device 60. The following descriptions will highlight important differences between the present invention and the design described in U.S. Pat. No. 3,035,495, as well as the operational features of the present invention.

Figure 5:
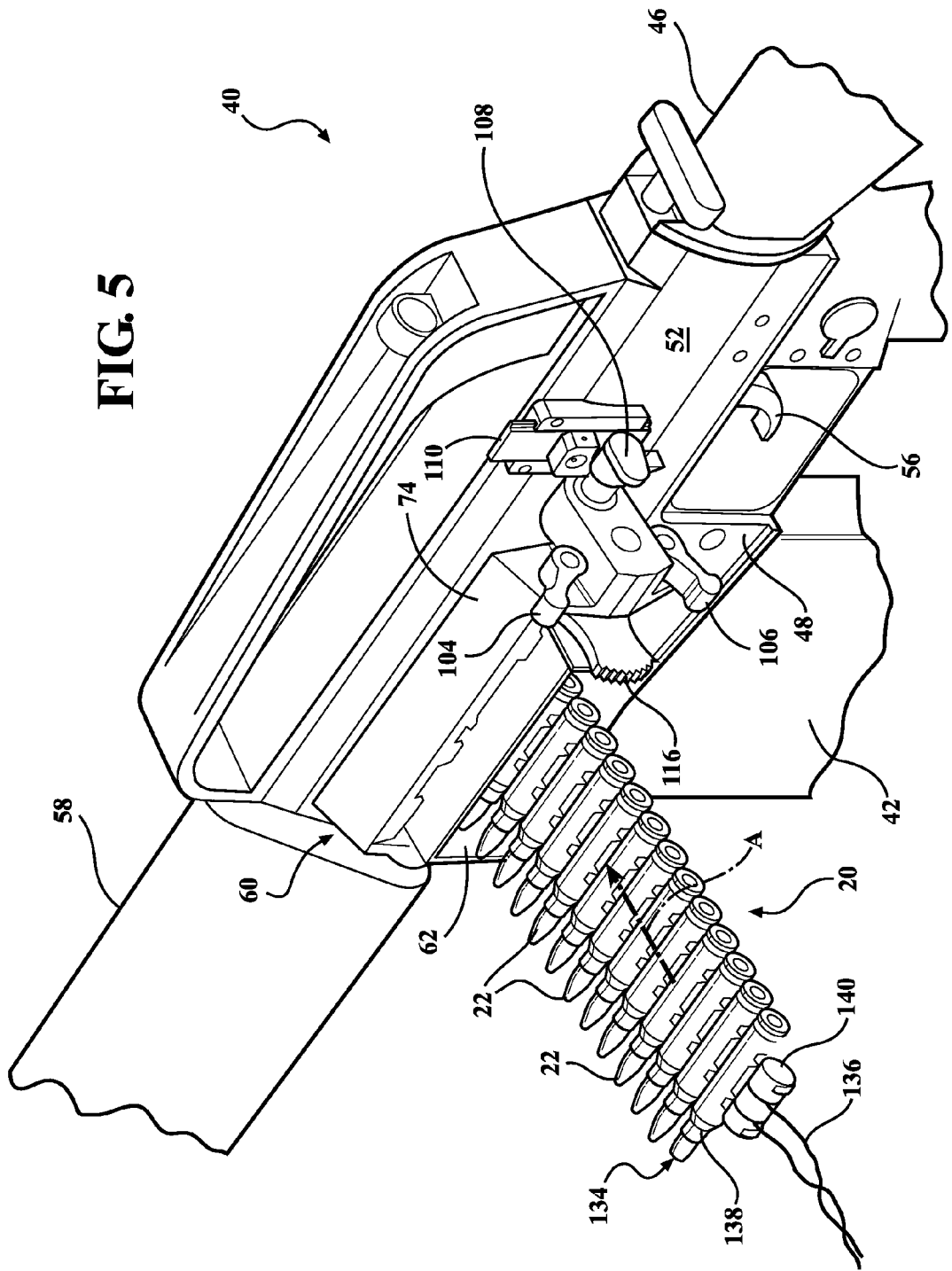
FIG. 5 is a fragmentary perspective view of an AR-15 receiver fitted with a belt feed device according to one embodiment of the present invention and showing an ammunition belt operatively extending therefrom.

Referring to FIGS. 5 through 16, the feeding device 60 is shown including a feed chute 62. The feed chute 62 defines a transverse feed path A configured to receive the ammunition belt 20 with lead cartridge 22A and connected lead link 24A through an inlet 64. The transverse feed path A is oriented generally perpendicular to the barrel 58 of the rifle 40, and extends directionally from left to right as viewed by a user shouldering the firearm 40, as shown in FIG. 5. A central stripping station is disposed along the transverse feed path A. Similar to the previously described central striping station of a magazine-fed system, the central stripping station of the belt feeding device 60 represents an ideal location from which the bolt-carrier group 44 can engage the lead cartridge 22A as it continues through the Feeding and Chambering cycles.

First 66 and second 68 outlets stem from the transverse feed path A. The first outlet 66 is provided for discharging the lead cartridge 22A that has been separated from the lead link 24A. The second outlet 68 is configured for discharging the lead link 24A that has been separated from the lead cartridge 22A. The central stripping station is disposed along the transverse feed path A at the first outlet 66 where the lead cartridge 22A is stripped from its link 24A as it is chambered in the firearm 40. As perhaps best shown in FIGS. 12 and 13, the feed chute 62 is provided with a spring flap 70 having a free end adjacent the central stripping station. The spring flap 70 helps control position of the lead cartridge 22A as it moves into the central stripping station and as it is pushed into the breach by the forward translating bolt-carrier group 44. A tip clearance notch 72 may be formed in the feed chute 62 at a forward end of the central stripping station so that the cartridge 22A tip does not snag as it is pushed into the breach.

Loose or spent links 24 exit the feed chute 62 through the second outlet 68. In some cases, it may be desirable to line the floor of the second outlet 68 with a hard metallic wear plate to prevent clogs.

Figure 6:
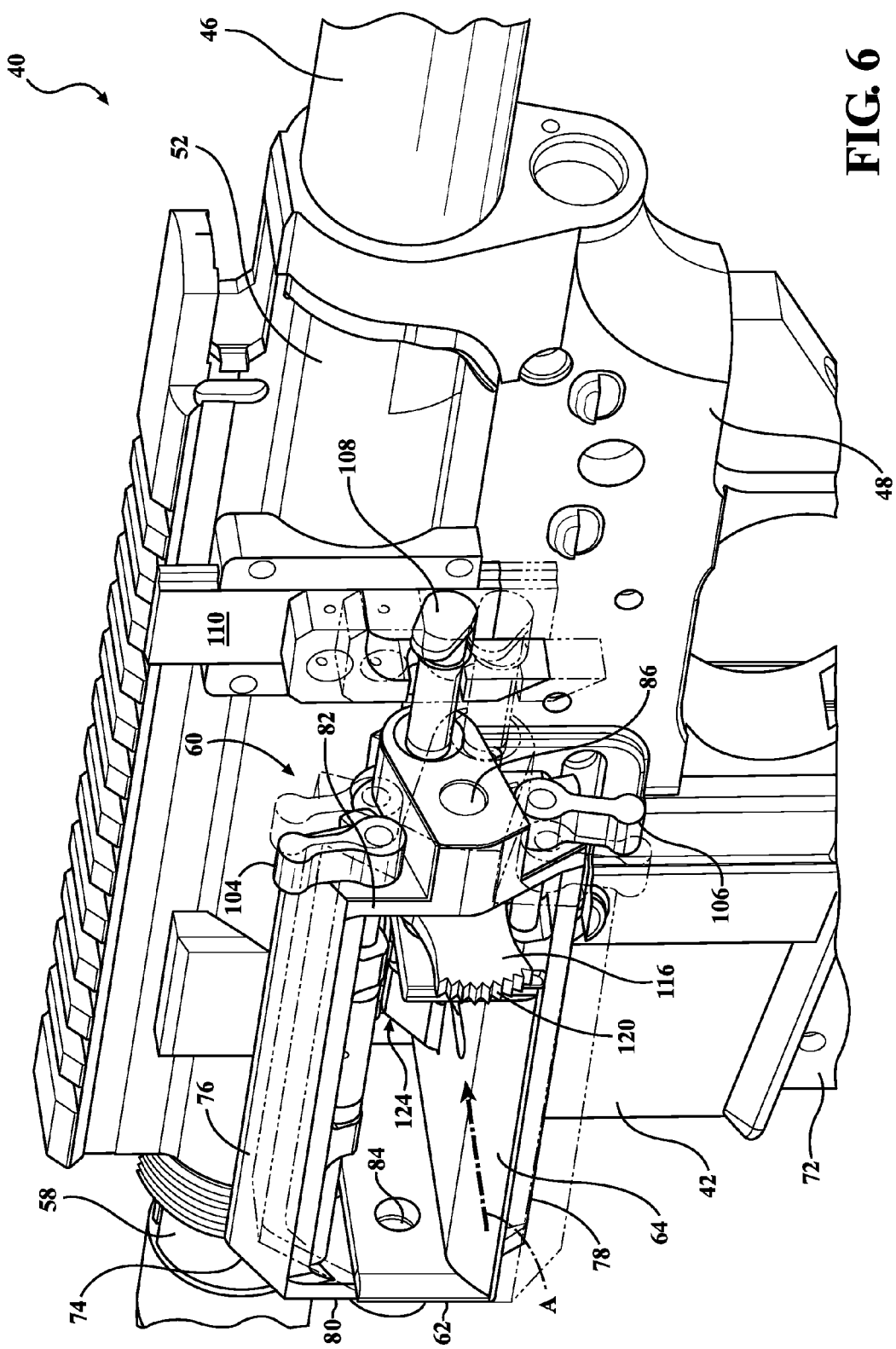
FIG. 6 is an enlarged perspective view of the belt feed device fitted to an AR-15 firearm.
Figure 11:
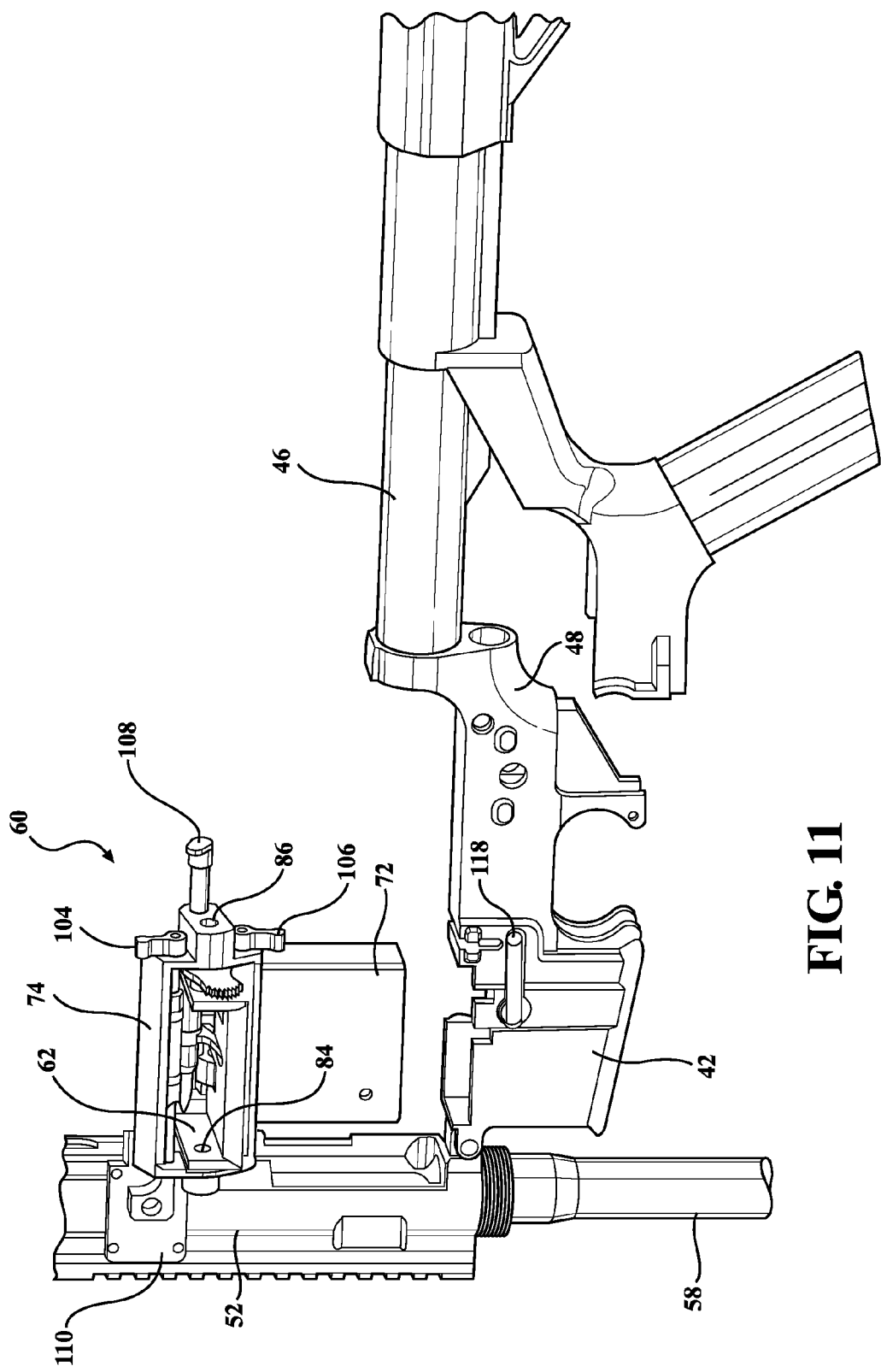
FIG. 11 is a semi-exploded view depicting the upper and lower receiver portions pivoted apart so that a belt feed device according to the present invention can be installed or removed therefrom.
Figure 12:
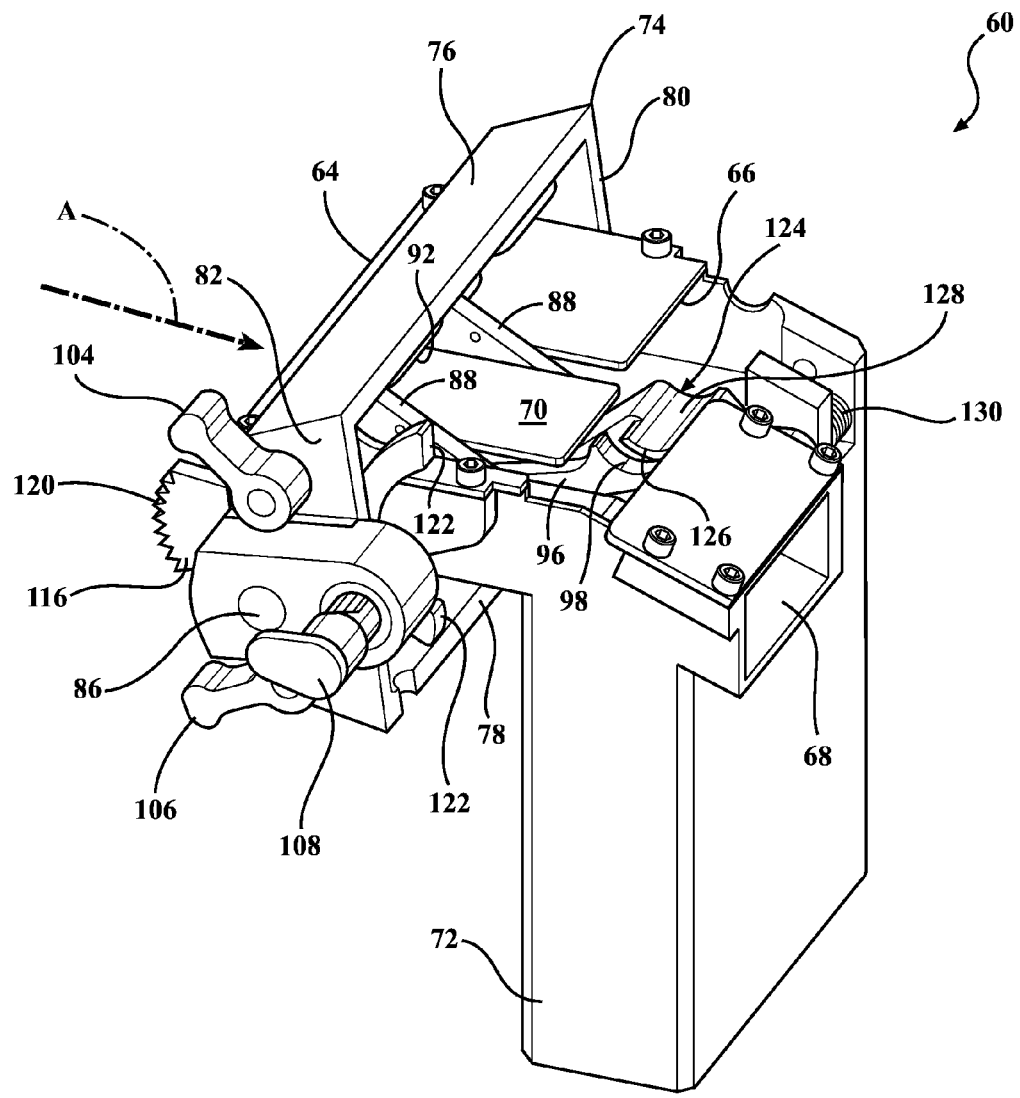
FIG. 12 is a perspective view of a belt feed device according to one embodiment of the invention.
Figure 13:
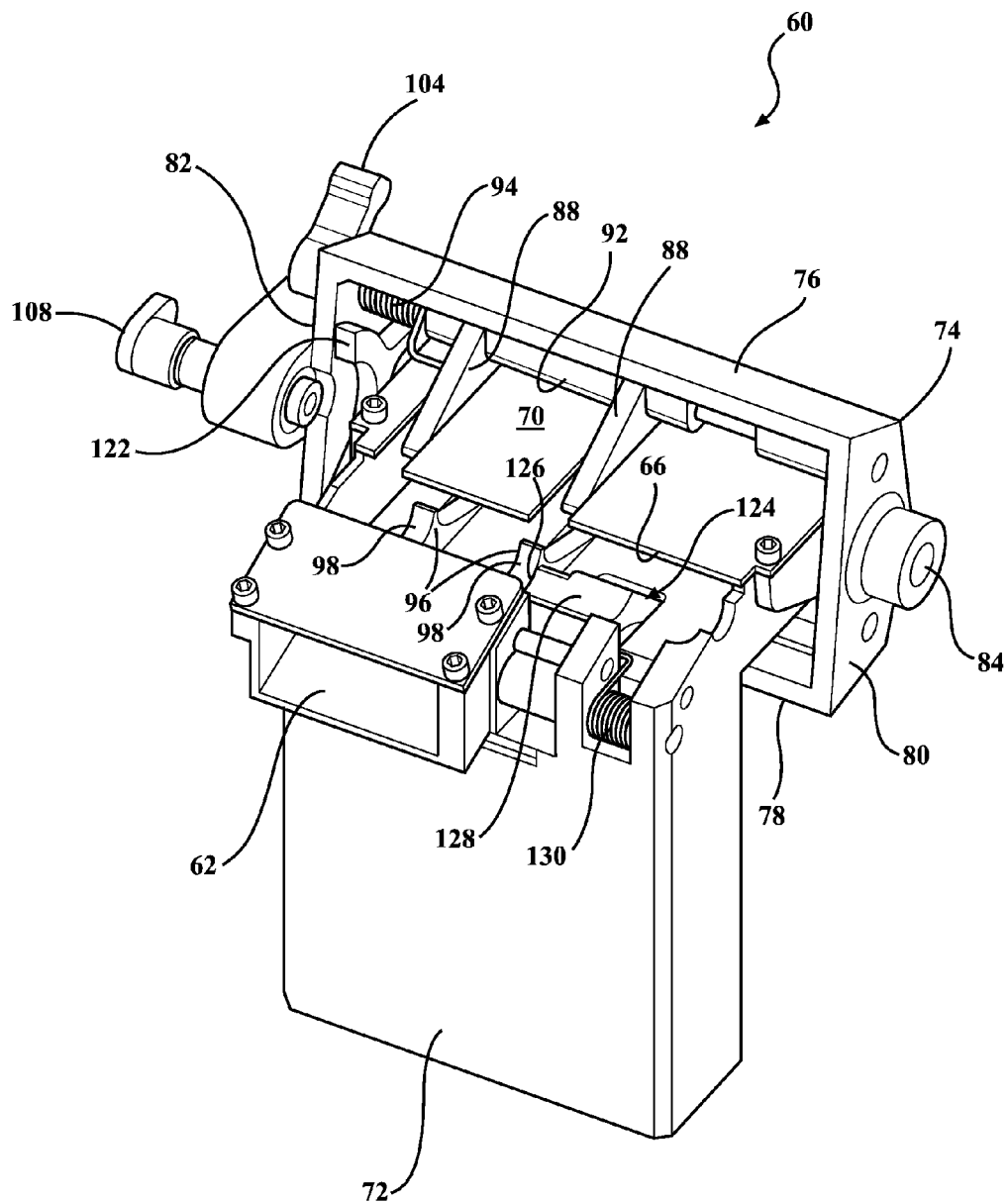
FIG. 13 is a perspective view of a belt feed device of FIG. 12 but from a different vantage.

The feeding device 60 may also include an attachment feature in the form of a mag well post 72. The mag well post 72 extends downwardly from the feed chute 62 as perhaps best shown in FIGS. 11-13. In one embodiment, the mag well post 72 is configured with a generally rectangular cross-section adapted to slide into a magazine well 42 when the upper 52 and lower 48 receiver portions are separated as depicted in FIG. 11. The mag well post 72 is retained in position with a snug slip fit in the mag well 42 coupled with a return of the upper 52 and lower 48 receiver portions to a closed operational position as shown in FIG. 6. Installation and removal of the feeding device 60 is thus relatively easy and can be accomplished without tools. To remove the feeding device, a user simply separates the upper 52 and lower 48 receiver portions, such as by removing the rear retaining pin, separate the upper 52 and lower 48 receiver portions (FIG. 11), and lifting out the feeding device 60. Once the upper 52 and lower 48 receiver portions are returned to a closed operational condition, cartridge-filled magazines can be inserted in the traditional manner into the mag well 42 and used to supply the firearm 40 with ammunition.

The feeding device 60 includes a transfer mechanism operatively associated with the feed chute 62 for sequentially moving the lead cartridge 22A and connected lead link 24A into the central stripping station. That is, the transfer mechanism is operatively associated with the feed chute 62 for successively advancing rounds of ammunition linked together as a belt 20 into the receiver 48, 52 of a self-loading firearm 40. The transfer mechanism includes a rocker frame 74 pivotally connected to the feed chute 62 adjacent the inlet 64. The rocker frame 74 may take various forms, but in the depicted embodiment is a generally rectangular configuration including an upper rail 76 and a lower rail 78 and a left stile 80 and a right stile 82. The feed chute 62 passes through and is surrounded by the rocker frame 74. A left pivot shaft 84 pivotally connects the left stile 80 to the feed chute 62, and a right pivot shaft 86 pivotally connects the right stile 82 to the feed chute 62. The left 84 and right 86 pivot shafts are located approximately mid-way between the inlet 64 and the central stripping station. The left 84 and right 86 pivot shafts are co-axially aligned, so that they work in concert to establish a unified axis about with the rocker frame 74 rocks back-and-forth in operation.

Figure 7:
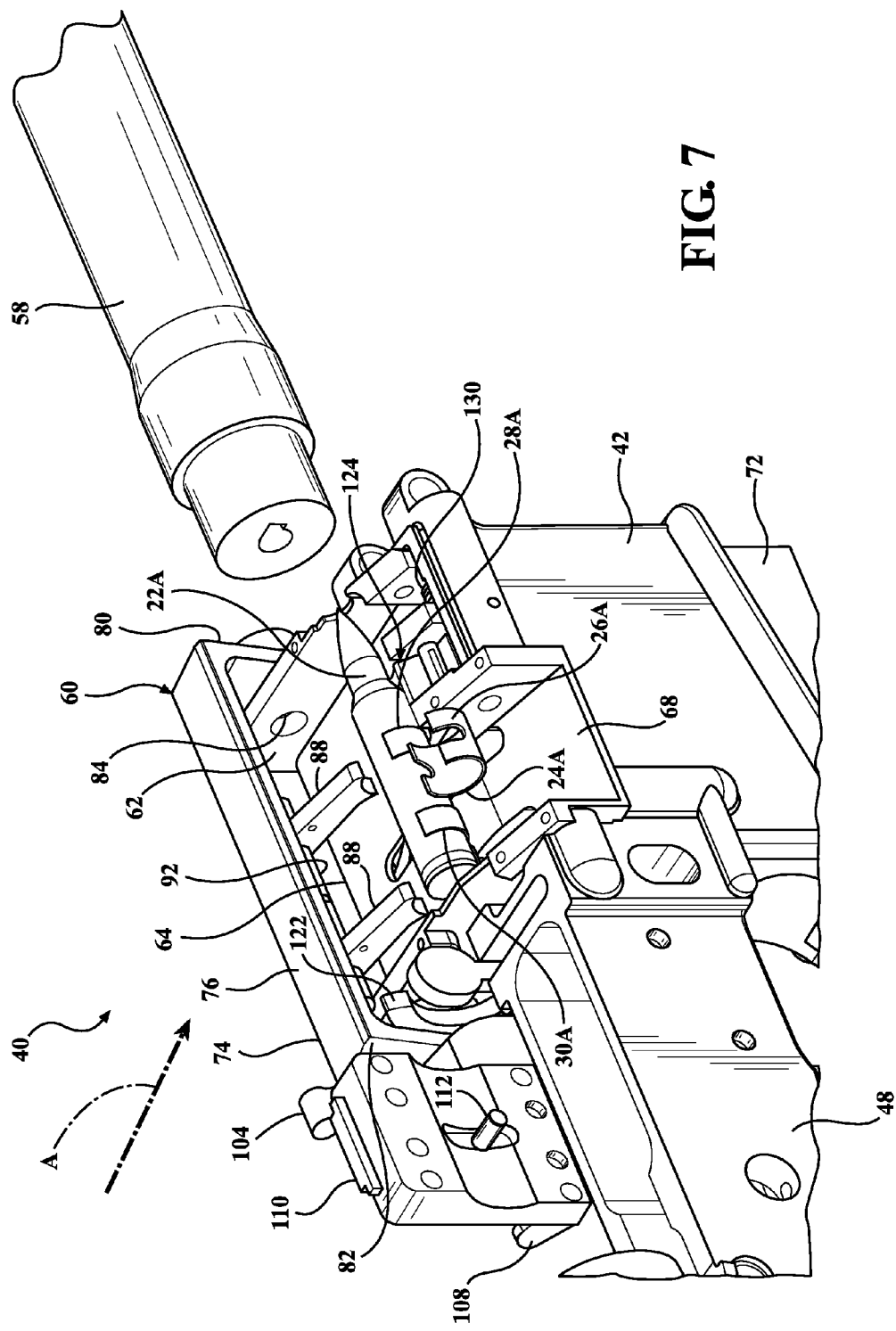
FIG. 7 is a simplified perspective view inside the firearm receiver showing a lead cartridge and lead link disposed in the central stripping station of the belt feed device.
Figure 14:
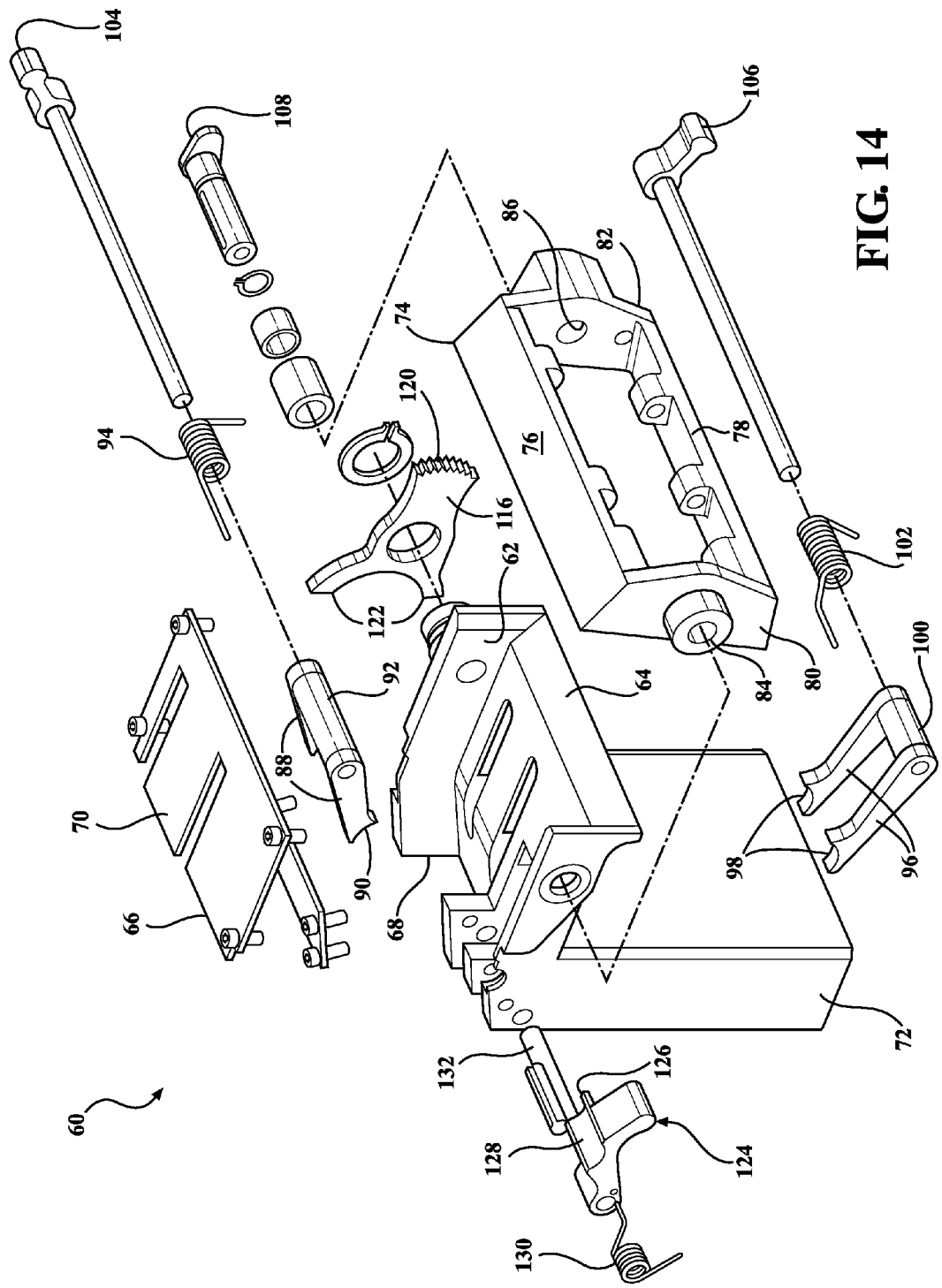
FIG. 14 is an exploded view of the belt feed device of FIGS. 12 and 13.
Figure 15:
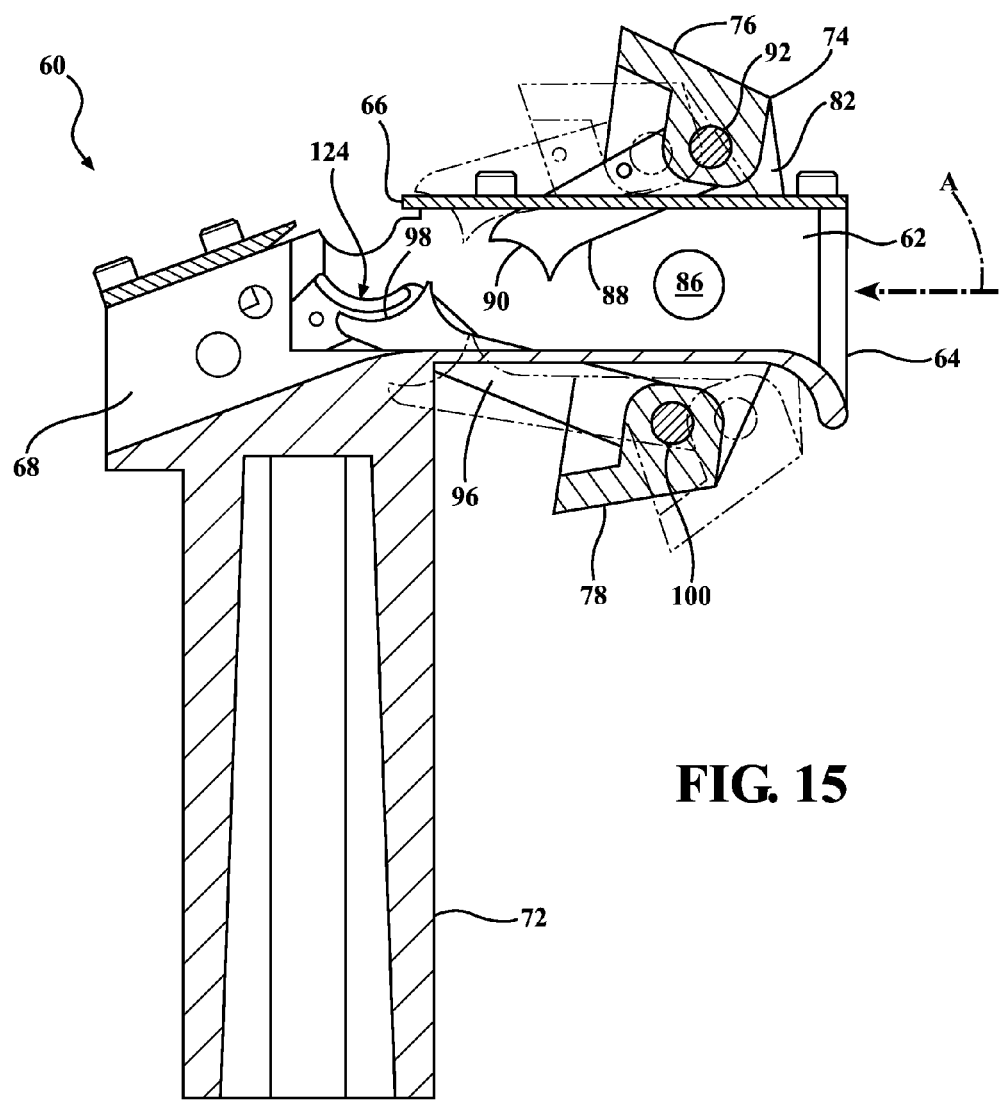
FIG. 15 is cross-sectional view illustrating the rocking motion of the transfer mechanism that sequentially advances cartridges into the firearm receiver.

As shown in FIG. 7, a pair of upper feed paws 88 are pivotally connected to the upper rail 76. Each upper feed paw 88 has a cupped distal end 90 that extends into the feed chute 62 from above. FIG. 15 illustrates that as the rocker frame 74 rocks back-and-forth, the cupped distal ends 90 of the upper feed paws 88 slide toward and away from the central stripping station. This motion is used to advance the cartridges 22 one-by-one toward the central stripping station. An upper paw shaft 92 pivotally supports both upper feed paws 88 for movement in unison, and a torsion spring 94 (FIG. 14) or other form of biasing element is operatively disposed between the upper feed paws 88 and the rocker frame 74 to provide a constant downward pressure at the cupped distal ends 90. When, as viewed from the perspective of FIG. 15, the rocker frame 74 is pivoted counter-clockwise, the cupped distal ends 90 push against the aligned cartridge 22 aided by the downward pressure of the spring 94. However, when the rocker frame 74 is pivoted clockwise (again as viewed from FIG. 15), the cupped distal ends 90 ride up and over the underlying cartridge 22 as the spring 94 yields thus allowing the upper feed paws 88 to re-set themselves behind the next in line cartridge 22.

Figure 8:
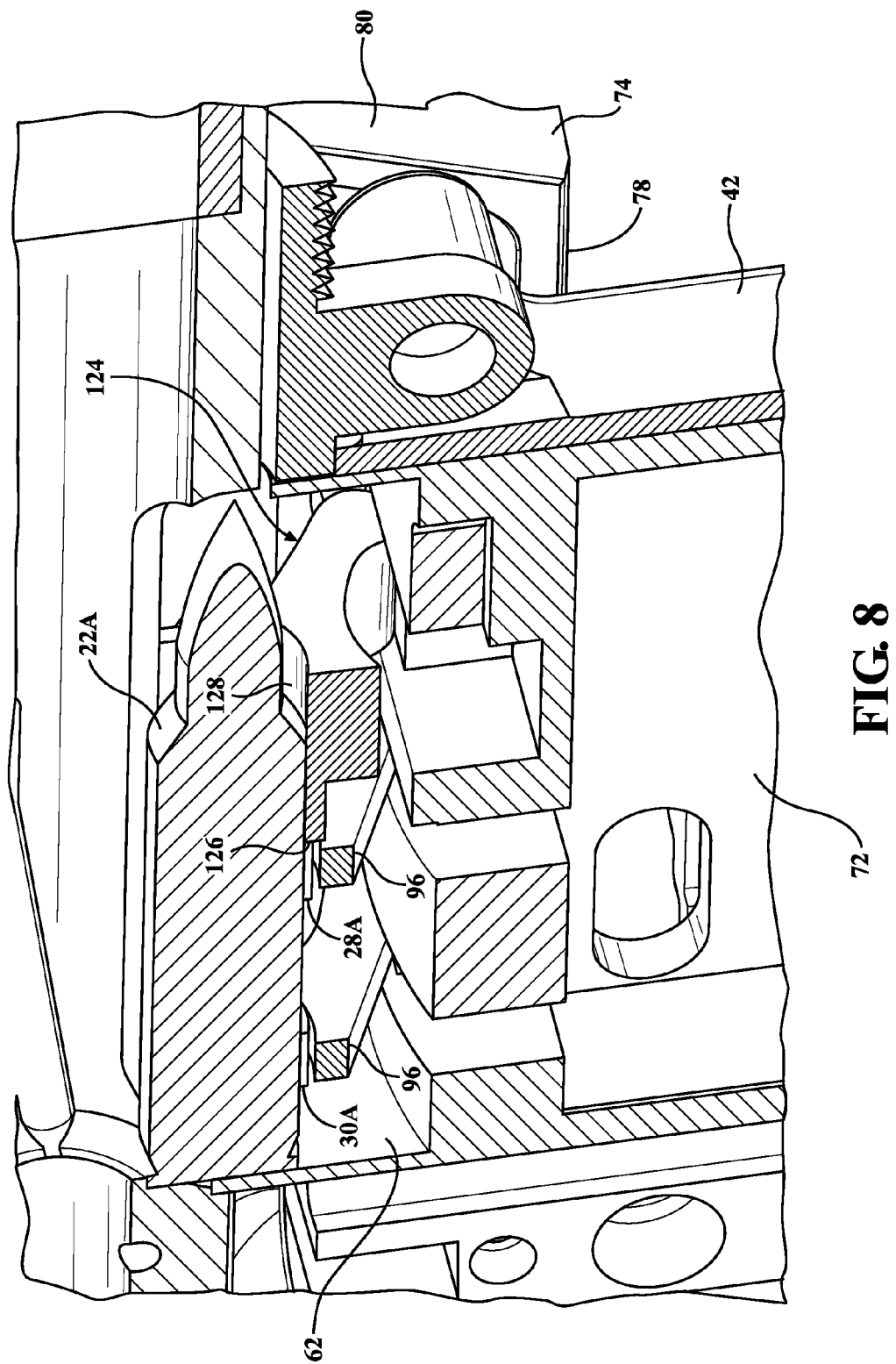
FIG. 8 is cross-sectional view taken longitudinally through the firearm receiver with a lead cartridge disposed in a central stripping station of the feed device.
Figure 9:
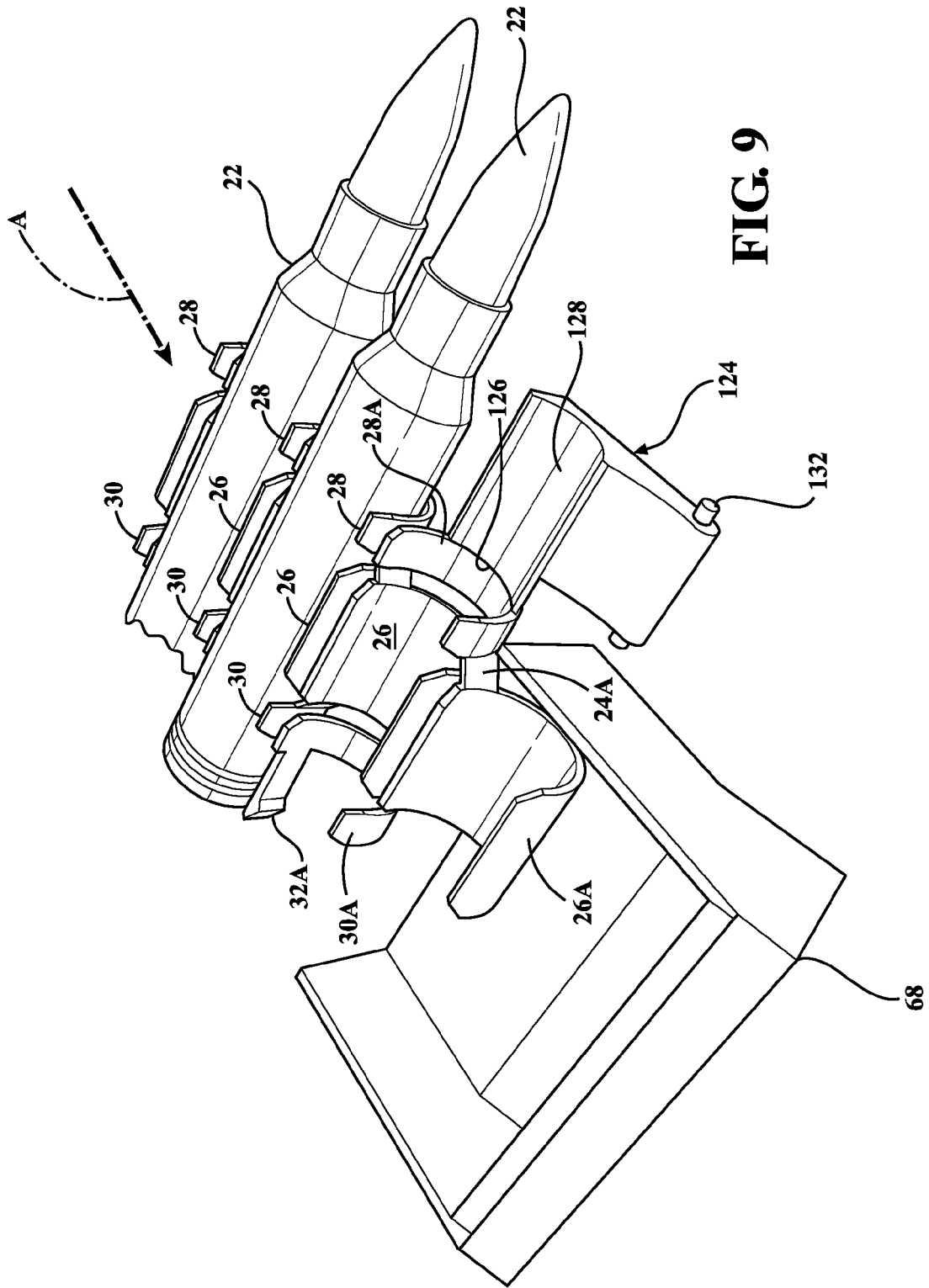
FIG. 9 is a highly simplified perspective view of the lead link abutting the sheering lip immediately after the lead cartridge has been stripped therefrom.

In similar fashion, a pair of lower feed paws 96 are pivotally connected to the lower rail 78, and each have cupped distal ends 98 that extend into the feed chute 62 from below, perhaps best shown in FIG. 8. The cupped distal ends 98 are configured to engage the front 28A and rear 30A loops of the lead link 24A, and to thrust the connected lead cartridge 22A up into the central stripping station for Feeding and Chambering. A lower paw shaft 100 pivotally supports the lower feed paws 96 in unison. A torsion spring 102 (FIG. 14) or other type of biasing element is operatively disposed between the lower feed paws 96 and the rocker frame 74 to provide a continuous upward bias on the lower feed paws 96. When, as viewed from FIG. 15, the rocker frame 74 is pivoted clockwise, the cupped distal ends 98 push against the front 28A and rear 30A loops of the lead link 24A, the lead cartridge 22A is pushed up into the central stripping station ready to be pushed through the lead link 22A as the bolt face 50 slides forward during the Feeing and Chambering portions of the auto-loading cycle. However, when the rocker frame 74 is pivoted counter-clockwise (as viewed from FIG. 15), the cupped distal ends 98 ride up and over the overlying link 24A as the spring 102 yields thus allowing the lower feed paws 96 to re-set behind the next in line link 24.

Figure 4:
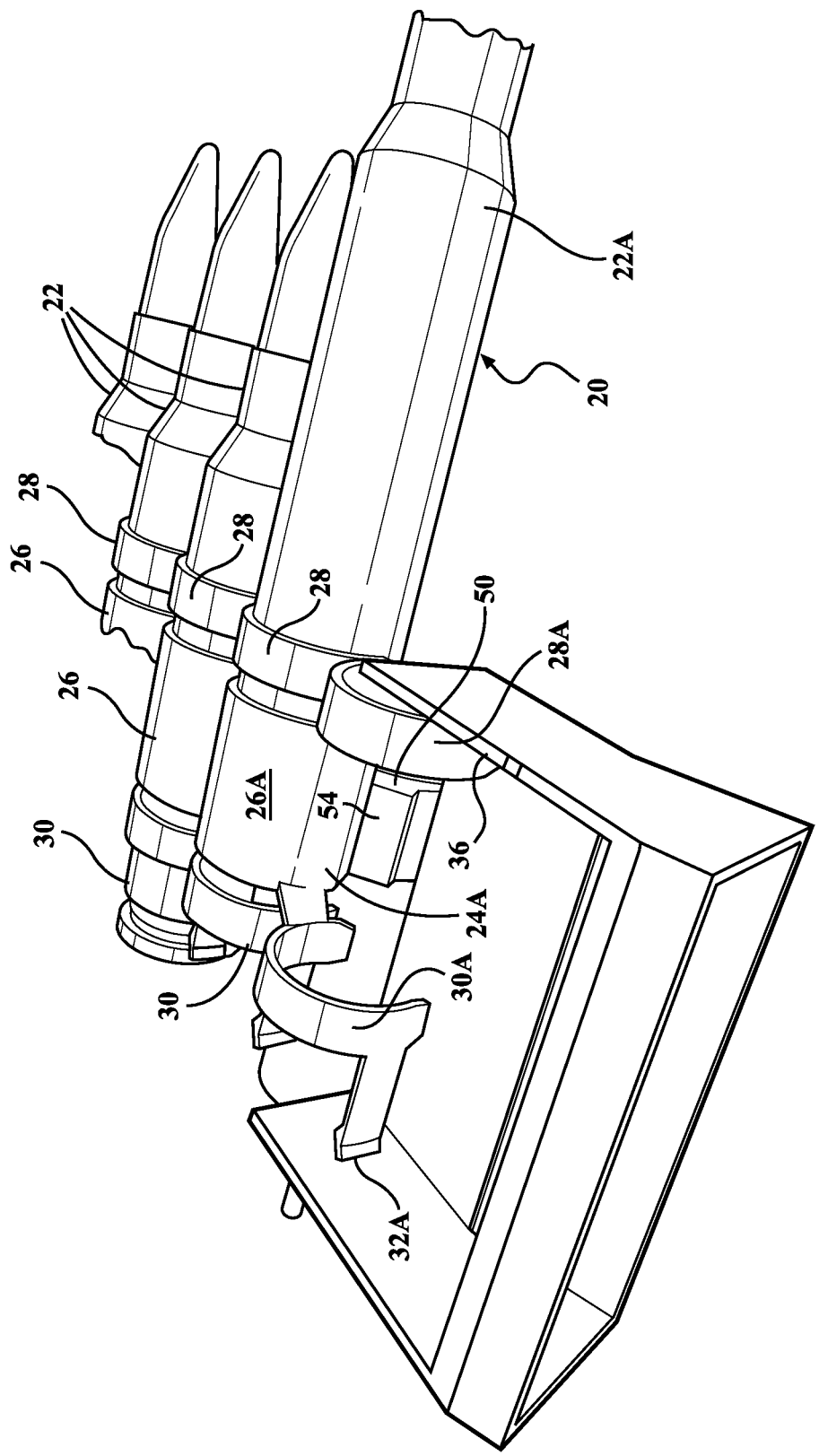
FIG. 4 is a partially sectioned perspective view of a prior art AR-15 type firearm illustrating the feeding and chambering steps of its standard firing cycle.

Thus, the feed paws 88, 96 are adapted to propel the belted cartridges 22 sequentially into the receiver of the firearm 40 where the lead cartridge 22A is extracted (i.e., stripped) by the bolt 44 during the Feeding and Chambering steps (see FIG. 4). The lower feed paws 96 also serve to (at least partially) support the lead cartridge 22A in a properly presented position (i.e., slightly lifted) so that the lead cartridge 22A may be readily released from the associated belt 20 without the possibility of jamming in the receiver portions 48, 52 of the firearm 40. This action of the feed paws 88, 96 is substantially identical to that described in U.S. Pat. No. 3,035,495.

Loading and un-loading of ammunition belts 20 is facilitated by upper 104 and lower 106 finger levers. The upper finger lever 104 is disposed on a distal end of the upper paw shaft 92. The lower finger lever 106 is disposed on a distal end of the lower paw shaft 96. Operated concurrently by the pinching motion of a user's thumb and forefinger, the finger levers 104, 106 enable manual pivoting of the respective distal ends 90, 98 out of the feed chute 62 so that ammunition belts 20 can be inserted or removed.

Mechanical actuation of the feeding device 60 is accomplished in the one depicted embodiment by a crank 108 that extends from the rocker frame 74. The crank 108 may be spring-loaded to enable telescopic compression toward the rocker frame 74, as shown in FIG. 14. The crank 108 interacts with a drive mechanism that is configured to produce an up-and-down linear output motion. Of course, other output motions and/or drive mechanism configurations are possible. In the depicted embodiment, the drive mechanism is operatively connected to the crank 108 through a slider 110 that is constrained to up-and-down motion against the exterior of the upper receiver 52. The telescopically compressible nature of the crank 108 facilitates quick connection to, and disconnection from, the slider 110.

Figure 17:
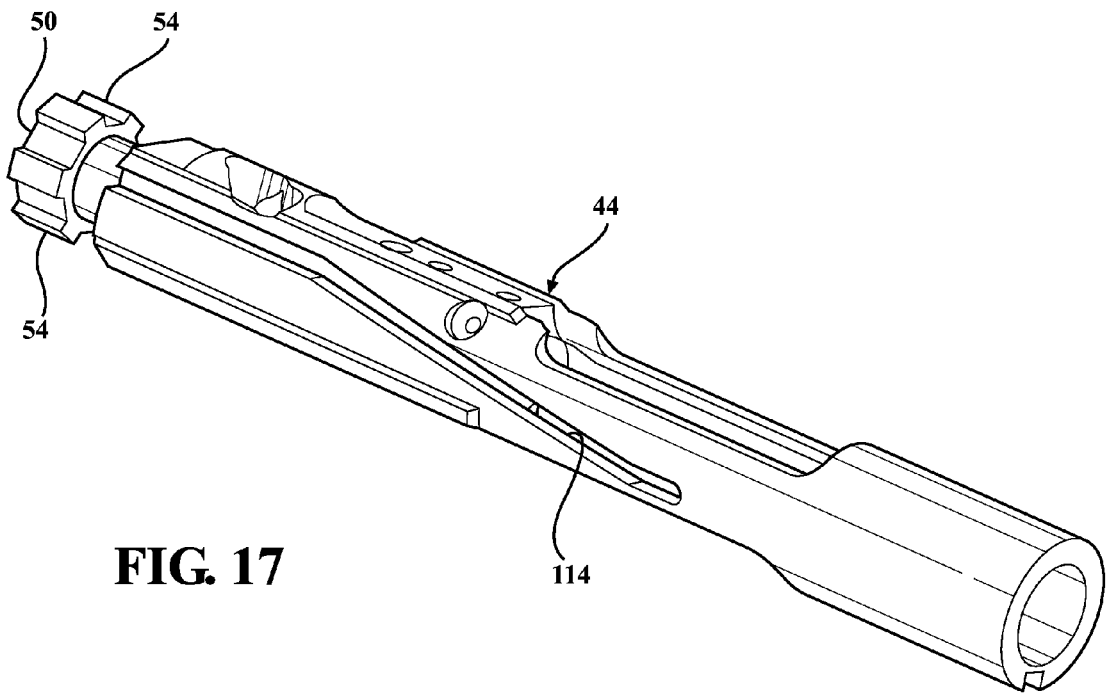
FIG. 17 is perspective view of a bolt-carrier according to one embodiment, wherein a linear cam slot is formed so as to interact with the drive mechanism.

As perhaps best shown in FIG. 7, a pin 112 extends from the slider 110 inwardly into the upper receiver 52. The pin 112, in turn, rides in a linear cam slot 114 formed in the bolt carrier 44 as illustrated in FIG. 17. As the bolt-carrier group 44 slides back and forth through the several stages of the auto-feeding process described above, the pin 112 is displaced up and down which in turn drives the slider 110 up and down. In this manner, up and down movement of the slider, and thus back-and-forth rocking of the rocker frame 74, is locked in a perfect timed sequence with the auto-feeding cycles of the firearm 40. As the bolt-carrier group 44 slides rearwardly (Extracting and Ejecting steps), the slider 110 is raised causing the rocker frame to pivot counter-clockwise (FIG. 15) and the lower feed paws 96 to lift a new lead cartridge 22A into the central stripping station. On the return stroke as the bolt-carrier group 44 slides forward (Feeding and Chambering steps), the slider 110 is lowered causing the rocker frame to pivot clockwise (FIG. 15) and the upper feed paws 88 to push the next in line lead cartridge 22A incrementally closer to the central stripping station. In the manner, the feeding device 60 walks, i.e., incrementally advances, cartridges one-at-a-time toward the central stripping station where they are stripped from the belt 20 and fed/chambered in the firearm 40.

Said another way, the paws 88, 96 are driven by a rocker frame 74 which in turn is rocked back-and-forth by a pin follower 112 that rides in a linear cam slot 114 milled in the bolt-carrier group 44 (FIG. 17). The pin follower 112 is joined to slider 110 in which is captured a crank 108, which in turn is joined to the rocker frame 74. As the bolt-carrier group 44 cycles back and forth, the pin follower 112 riding in the cam slot 114 is forced up and down which in turn causes the crank 108 and adjoining rocker frame 74 to oscillate back-and-forth and the paws 88, 96 to push the cartridges 22 forward in alternating fashion. FIG. 15 best illustrates the oscillating motion of the rocker frame 74.

The feeding device 60 may be optionally fitted with a bolt catch extension 116 for remotely actuating the standard bolt catch 118 located on the lower receiver 48. According to well-known concepts, when the bolt-carrier group 44 is locked open such as after firing the last cartridge 22, the bolt catch 118 may be depressed to allow the bolt-carrier group 44 to move forward under the influence of the spring in the buffer assembly 46. However, when the present feeding device 60 is fitted to the firearm 40, such release of the bolt catch 118 will cause the rocker frame 74 to rock due to the interaction of the pin 112 in the cam slot 114 of the bolt-carrier 44 (via the crank 108). An operator's finger could potentially be pinched by the quickly pivoting rocker frame 74 if the user were to reach behind the rocker frame to directly depress the bolt catch 118. For this reason, the bolt catch extension 116 allows the operator to manipulate the bolt catch 118 with fingers moved outside the pinch zone of the rocker frame 74. The bolt catch extension 116 is pivotally carried on the right pivot shaft 86. In particular, the bolt catch extension 116 may be disposed between the right stile 82 and the feed chute 62. As perhaps best shown in FIG. 14, the bolt catch extension 116 has an exterior finger grip 120 and a pair of spaced legs 122. Depending on the particular rocked position of the rocker frame 74, one of the legs 122 will be in an ideal position to engage the bolt catch 118 upon manipulation of the finger grip 120.

The feeding device 60 includes a novel de-linking arm, generally indicated at 124 in FIGS. 8-10B. The de-linking arm 124 is pivotally disposed in the feed chute 62 at the central stripping station for the purpose of establishing a firm anchor point against which forward movement of the lead link 24A is resisted during the Feeding and Chambering phases of the firing cycle, so that the lead cartridge 22A can be easily stripped from the belt 20. More particularly, the de-linking arm 124 is provided with a sheering lip 126 that is configured to engage the leading edge of the front loop 28A of the lead link 24A in order to resist separating forces when the lead cartridge 22A is pushed through the first outlet 66 by closing bolt-carrier group 44. The sheering lip 126 is preferably arcuate, conforming to the shape of the front loop 28A. The sheering lip 126 is shown in the illustrations milled square, or generally square, relative to the front loop 28A of the lead link 24A so that it abuts along a flat full surface area.

In some cases, it may be helpful to modify the sheering lip 126 to reduce the potential for slippage against the front loop 28A as the cartridge 22A is pushed out for Feeding/Chambering. If slippage occurs, the lead link 24A is likely to be pushed over the de-linking arm 124 resulting in a jam. Various techniques are available to modify the sheering lip 126 so that the grip at this critical interface will be increased. One contemplated technique is to apply a texture to the surface of the sheering lip 126. A texture may include knurling or roughening. One roughening technique is to apply an electric deposit of carbide or other hard material. This has the added benefit or making the sheering lip 126 harder as well as rougher. Another contemplated technique is to intentionally mill the sheering lip 126 at a non-square angle relative to the front loop 28A. For example, a 2° angle may be introduced on the sheering lip 126 in a left-side direction, a right-side direction or a back-cut direction. Left-side and right-side cuts will tend to concentrate the point of contact forces at either of the left or right side tips of the sheering lip 126. A back-cut direction will tend to concentrate the point contact forces at both of the left and right side tips of the sheering lip 126. In practice, a left-side cut has been found to provide impressive results. For the avoidance of doubt, a left-side cut describes a geometrical modification to the sheering lip 126 in which its surface is milled flat but with a slight cant or tilt converging toward the edge of the front loop 28A on the side closest to the second opening 68. That is, with a left-side cut there may appear a very small gap between the edge of the front loop 28A and the sheering lip 126 on the side closest to the inlet 64. Modifications can also include combinations of these examples as well as other techniques.

A cradle 128 extends from the sheering lip 126 and is scalloped to match the curvature of the casing of the cartridge 22A. A lift spring 130 biases the cradle 128 upwardly to help support the lead cartridge 22A in the central stripping station as the bolt-carrier group 44 separates the lead cartridge 22A. The lift spring 130 assists the lower feed paws 96 to support the lead cartridge 22A in a properly presented position (i.e., slightly lifted) so that the cartridge 22A may be readily released from the belt 20 without the possibility of jamming in the receiver 48, 52. In the illustrated example, the de-linking arm 124 is pivoted on a shaft 132. The lift spring 130 continuously urges the de-linking arm 124 toward an elevated stripping position so as to properly present the lead cartridge 22A for Feeding and Chambering. However, as each new cartridge 22 is loaded into position, the lift spring 130 allows the cradle 128 to yield slightly downwardly to a lowered non-stripping position for ease of cartridge feeding. The lift spring 130 is shown in FIG. 14 as a coil-type torsion spring, however flat leaf springs and other types of biasing elements may be used with minor modification. For one example, a flat leaf spring may be positioned directly under the cradle 128.

As shown in the progressive views of FIGS. 10A and 10B, the bolt face 50 moving between its Feeding and Chambering stages pushes the end of the lead cartridge 22A. Because the sheering lip 126 acts as an anchor point, the lead link 24A is held fast as the lead cartridge 22A is pushed toward the firearm chamber. It is noteworthy that the sheering lip 126 is located directly below the lead cartridge 22A when the cartridge 22A is elevated into the central striping position. Such placement of the de-linking arm 124 directly below the lead cartridge 22A results in a longitudinal alignment of pushing and reaction forces. That is, the longitudinally directed pushing force applied by the bolt face 50 to the end of the cartridge 22A lies in generally the same vertical plane as the reaction force applied by the sheering lip 126 to the front loop 28A of the lead link 24A. By aligning the pushing and reaction forces, the present invention achieves a substantial reduction in torsional binding forces on the cartridge 22A (as compared with prior art systems that restrain the lead link 24 inside the ejection chute as in U.S. Pat. No. 3,035,495). Reduced torsional forces means that the cartridges 22A push through their links 24A more easily. Reduced torsional forces also means that the cartridges 22A receive less abrasion and plastic deformation. Therefore, the present invention results in less stress and abrasion to the casing of cartridges 22, thus making them better suited for re-loading. The present invention also results in a substantially lower likelihood of jams due to the reduced push-through resistance.

Of course, those of skill in the art will appreciate various alternative constructions and implementations for the de-linking arm 124 which may include alternative methods of support and bias. One such contemplated variation (not shown) is a reconfiguration of the feeding device 60 to accommodate belted ammo 22 fed in the traditional "brass-to-the-grass" manner like that shown in FIGS. 2 and 3. This can be accomplished by engineering the feeding device 60 so that the de-linking arm 124 is located over top of the round of ammo 22A in the firearm receiver 52. Those of skill in the art will be able to envision how the receivers 48, 52 and feeding device 60 can be reconfigured to accommodate belted ammo 22 in Standard Military Feed orientation. This alternative arrangement has advantages over the current prior art systems in that substantially less torsional (i.e., binding) forces are placed upon the ammo 22 and the links 24. The reduction in torsional forces leads to reduced wear, reduced malfunction rates, and the ability to utilize alternative materials like for the links 24, including plastics and bio-degradable materials.

It should be noted that another distinct advantage of the present feeding device 60 relates to the accommodation of specialized bullets. For ballistic purposes, a user may sometimes desire to shoot ammunition 22 having a long projectile (i.e., bullet). For example, in some long-distance shooting situations, it is believed that greater ballistic stabilization can be achieved with a longer length of projectile. Alternatively, in some hunting situations a heavy projectile is desired, but the weight can only be achieved by lengthening the projectile. The latter concern has been exacerbated by the use of alternative projectile materials that are lighter in weight that traditional lead. However, there is a maximum over-all length (OAL-MAX) of ammunition 22 that can be used in Mil-Spec AR-15's (and AR-10's, etc.) due to the fixed length of the magazine well 42. In other words, even though a shooter may wish to use specially crafted cartridges 22, they are limited in their selection of projectiles to those having an over-all length which is less than the maximum clearance of a Mil-Spec magazine well. Thus, shooters that desire to shoot longer tip bullets cannot utilize an AR-15 (or AR-10, etc.) platform, but instead must use a specially chambered bolt-action rifle.

However, the present feeding device 60 effectively by-passes the magazine well 42 altogether and therefore has the potential to accommodate extra-long length cartridges 22. By simply adjusting some of the dimensions of the feeding device 60, ammunition 22 may be used that would otherwise exceed the published OAL-MAX by 5-10 mm for a Mil-Spec AR-15 type rifle. As a result, a shooter that prefers to shoot an AR-type platform rifle over a bolt-action rifle can do so while still enjoying the use of specially crafted, long-length ammunition 22. Naturally, other rifle platforms may likewise benefit from this advantage of the present feeding device 60, and it is not intended to be implied that the present feeding device 60 is exclusively intended for AR-type platforms.

In use, the present feeding device 60 may be installed in an AR-15 type firearm 40 by relative straight-forward modifications to stock (i.e., OEM) receiver 48, 50 components. Such modifications are well within the range of most qualified gunsmiths. The left side of the lower receiver 48 is notched to provide clearance for the feed chute 62, as shown in FIG. 11. The upper receiver 52 remains largely unmodified, except to provide for the reciprocating pin 112 and externally carrier slider 110. The bolt-carrier 42 is also largely unmodified, except for the introduction of the cam slot 40 (FIG. 17). Again, modifications to these components are also within the range of most qualified gunsmiths. All other features and functions of the firearm remain consistent with the original manufacturer's intent. Importantly, standard replacement parts can be used for all components of the receiver, trigger group and bolt and carrier group.

Because each cartridge 22 is supported by two adjacent and interlocking links 24, the last cartridge 22 in a belt 20 is typically rendered unusable because the feed mechanism 60 cannot properly support the final cartridge 22 as it is stripped from its link 24 and fed into the firing chamber. Most often, a jam situation occurs with the last cartridge 22 that the operator must clear by manually opening the bolt 44 and following standard jam clearing protocols. There is therefore a need in the art for an improved end-of-link stop feature that allows the last round of ammo 22 to be properly fed and fired while avoiding a jam condition. The improved end-of-link stop feature must be relatively inexpensive, robust, easily attached and reliable.

Figure 19:
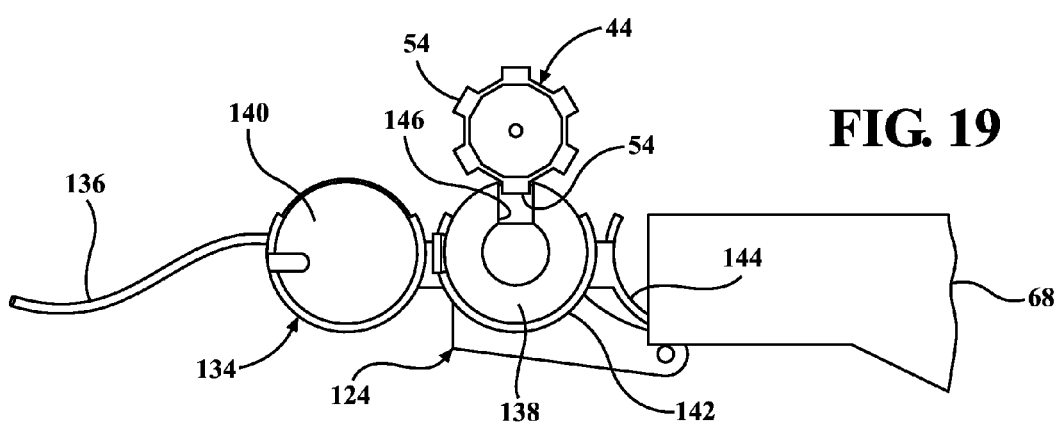
FIG. 19 is an end view showing the end-of-link assembly disposed in the receiver of a firearm in relation to the crenellated bolt face typical of an AR-15 style rifle.
Figure 16:
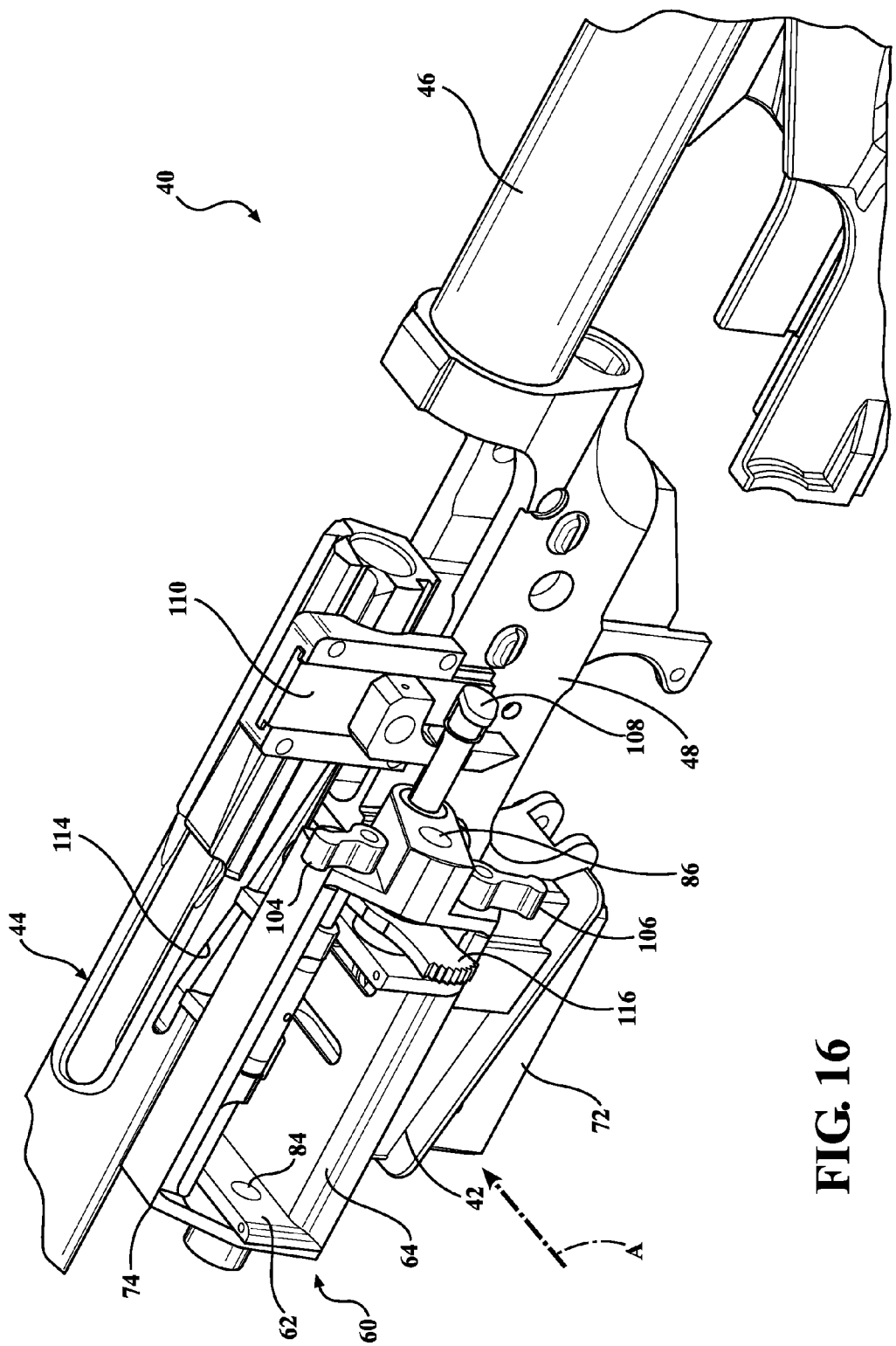
FIG. 16 is a fragmentary perspective view of one embodiment showing the drive mechanism actuated through back-and-forth motion of the bolt-carrier to produce a linear output motion which in turn induces a rocking motion of the transfer mechanism.
Figure 18:
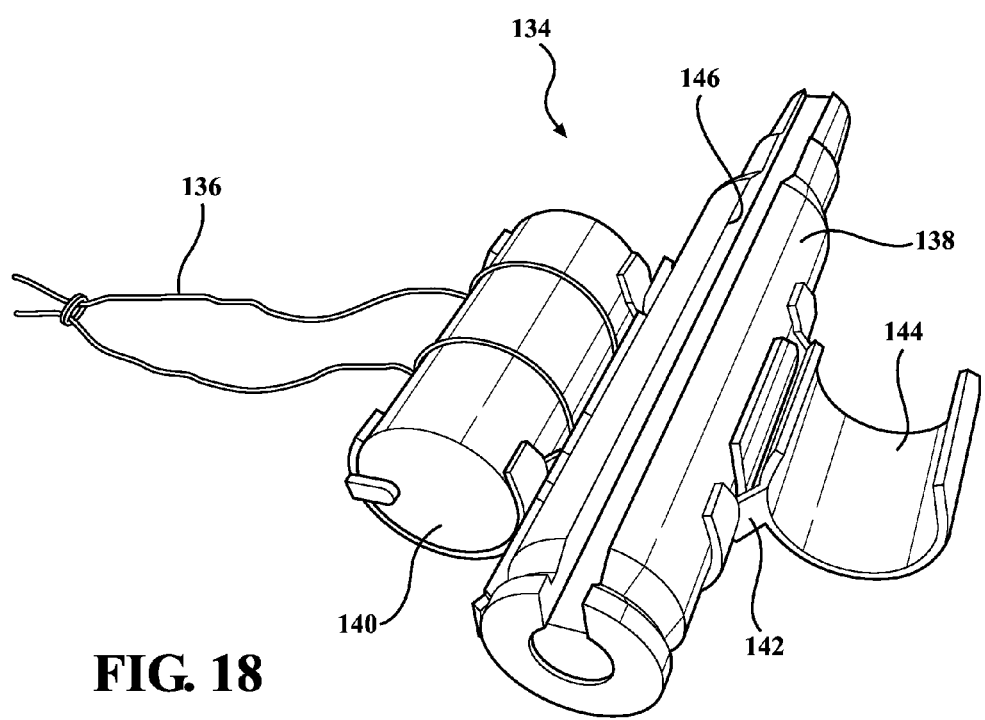
FIG. 18 is a perspective view of an end-of-link assembly according to one embodiment of this invention.

FIGS. 18 and 19 illustrate one embodiment of an improved end-of-link stop feature, generally indicated at 134, that can be used with the present feeding device 60 and also with prior art belt feed systems. FIG. 5 shows an AR-type firearm 40 fitted with the feeding device 60 of the present invention. Again, it is to be understood that with little or no alteration the end-of-link stop feature 134 can be used also with prior art type belt feed systems. The end-of-link stop feature 134 occupies the position of two cartridges, and may be fitted for convenience with a short lanyard 136. By utilizing the end-of-link stop feature 134, every round of ammunition 22 in a linked belt 20 can be fired without the final one or two cartridges 22 provoking a jam. In FIG. 5, the trailing end of a linked belt 20 includes the present end-of-link stop feature 134 occupying the position of two final cartridges/links but being non-firing (i.e., non-ammunition) elements.

As perhaps best shown in FIG. 18, the end-of-link stop feature 134 comprises a penultimate dummy cartridge 138 and an anchor bar 140. The anchor bar 140 may have a simple cylindrical shape and be formed from any suitable metal or hard plastic material. The penultimate dummy cartridge 138 may comprise a formed metal or hard plastic member resembling generally the size and shape of an actual cartridge 22 contained with the linked belt 20 to which the end-of-link stop feature 134 is attached. A modified final link 142 is formed with a central loop 144 much like the central loop 26 of a standard Mil-Spec link 24. The central loop 144 surrounds the cylindrical body of the anchor bar 140. The final link also includes front and rear loops that engage the penultimate dummy cartridge 138 in much the same way that front 28 and rear 30 loops of a Mil-Spec link 24 engage a standard cartridge 22. One notable distinction of the final ink 142 is that it can omit a feature corresponding to the positioning finger 32 of a Mil-Spec link 24. Thus, the final link 142 couples the penultimate dummy cartridge 138 and the anchor bar 140, and includes a forwardly extending central loop 144. The central loop 144 serves as the connection between the end-of-link stop feature 134 and the next (live) cartridge 22 in the belt 20 of linked Mil-Spec ammunition. Alternatively, the final link 142, penultimate dummy cartridge 138 and anchor bar 140 could be formed as a monolithic unit from molded plastic or other suitable material. Many other options are likewise possible.

The penultimate dummy cartridge 138 is distinguished by a groove 146 extending along its full longitudinal length (i.e., in a direction generally parallel to the length of the firearm barrel 58 when in use). The purpose of the groove 146 is to provide sliding clearance for the lug 54 of the bolt face 50 which would otherwise engage the base rim of a cartridge 22 and push it into the firing chamber. This is perhaps best illustrated in FIG. 19 where, upon presentation of the penultimate dummy cartridge 138 into position for feeding into the firing chamber, the bolt face 50 will slide past the penultimate dummy cartridge 138 without stripping it from its modified link 142. FIG. 19 is a simplified rear view showing how the groove 146 provides clearance for the bolt lug 54 to travel forwardly to a "bolt-closed" position without applying a "link stripping" force to the penultimate dummy cartridge 138.

As a result, after the last live round of ammo 22 is fired, the feeding device 60 (or a prior art feed mechanism) advances the penultimate dummy cartridge 138 into firing position in the receiver, but the bolt 44 encounters no resistance from the end-of-link stop feature 134 and closes without jamming in much the same manner if no cartridge 22 were present in the receiver at all. Then, in order to extract the end-of-link stop feature 134, a user manually pinches the finger levers 104, 106 to release the paws 88, 96 and then tugs on the lanyard 136. With this action, the end-of-link stop feature 134 is pulled out of the feeding device 60.

The foregoing invention has been described in accordance with the relevant legal standards, thus the description is exemplary rather than limiting in nature. Variations and modifications to the disclosed embodiment may become apparent to those skilled in the art and fall within the scope of the invention.

What is claimed is:

1. A feeding device for ammunition cartridges connected together in an elongated belt by separable links wherein the firearm individually separates a lead cartridge and a lead link from the remainder of the ammunition belt prior to chambering the lead cartridge in a breach, said device comprising:
    a feed chute defining a transverse feed path configured to receive the ammunition belt with lead cartridge and connected lead link through an inlet, said feed chute including a central stripping station disposed along said transverse feed path, a first outlet for discharging the lead cartridge separated from the lead link, a second outlet for discharging the lead link separated from the lead cartridge,
    a transfer mechanism operatively associated with said feed chute for sequentially moving the lead cartridge and connected lead link into the central stripping station,
    a sheering lip disposed in said stripping station, said sheering lip configured to engage a portion of the lead link directly below the lead cartridge to resist separating forces when the lead cartridge is pushed through said first outlet with minimal induced torsional stress, and
    a de-linking arm extending from said sheering lip, said de-linking arm moveably disposed together with said sheering lip in said feed chute between stripping and non-stripping stations.

2. The device of claim 1, wherein said stripping station is elevated above said non-stripping station.

3. The device of claim 1, wherein said de-linking arm is pivotally attached to said feed chute.

4. The device of claim 1, further including a lift spring continuously biasing said sheering lip toward said stripping station.

5. The device of claim 1, wherein said sheering lip has an arcuate curvature.

6. The device of claim 5, wherein said de-linking arm includes a cradle extending forwardly from said sheering lip, said cradle having a curvature generally equal to the arcuate curvature of said sheering lip.

7. The device of claim 1, wherein said feed chute includes a hardened metal wear plate disposed in said second outlet.

8. The device of claim 1, further including a bolt catch extension, said bolt catch extension pivotally carried on said transfer mechanism, said bolt catch extension having an exterior finger grip and a pair of spaced apart legs.

9. A feeding device for ammunition cartridges connected together in an elongated belt by separable links wherein the firearm individually separates a lead cartridge and a lead link from the remainder of the ammunition belt prior to chambering the lead cartridge in a breach, said device comprising:
 a feed chute defining a transverse feed path configured to receive the ammunition belt with lead cartridge and connected lead link through an inlet, said feed chute including a central stripping station disposed along said transverse feed path, a first outlet for discharging the lead cartridge separated from the lead link, said first outlet disposed above said stripping station, a second outlet for discharging the lead link separated from the lead cartridge, a mag well post having a generally rectangular cross-section configured to slide into a magazine well,
 a transfer mechanism operatively associated with said feed chute for sequentially moving the lead cartridge and connected lead link into the central stripping station, said transfer mechanism including a crank,
 a drive mechanism configured to produce a linear output motion, said drive mechanism operatively connected to said crank, and
 a sheering lip disposed in said stripping station, said sheering lip configured to engage a portion of the lead link directly below the lead cartridge to resist separating forces when the lead cartridge is pushed through said first outlet with minimal induced torsional stress.

10. The device of claim 9, further including a de-linking arm extending from said sheering lip, said de-linking arm pivotally disposed together with said sheering lip in said feed chute between an elevated stripping station and a lowered non-stripping station.

11. The device of claim 10, further including a lift spring continuously biasing said sheering lip toward said stripping station.

12. The device of claim 9, wherein said sheering lip has an arcuate curvature.

13. The device of claim 12, further including a de-linking arm extending from said sheering lip, said de-linking arm pivotally disposed together with said sheering lip in said feed chute between an elevated stripping station and a lowered non-stripping station, wherein said de-linking arm includes a cradle extending forwardly from said sheering lip, said cradle having a curvature generally equal to the arcuate curvature of said sheering lip.

14. The device of claim 9, further including a bolt catch extension, said bolt catch extension pivotally carried on said transfer mechanism, said bolt catch extension having an exterior finger grip and a pair of spaced apart legs.

15. A feeding device for ammunition cartridges connected together in an elongated belt by separable links wherein the firearm individually separates a lead cartridge and a lead link from the remainder of the ammunition belt prior to chambering the lead cartridge in a breach, said device comprising:
 a feed chute defining a transverse feed path configured to receive the ammunition belt with lead cartridge and connected lead link through an inlet, said feed chute including a central stripping station disposed along said transverse feed path, a first outlet for discharging the lead cartridge separated from the lead link, said first outlet disposed above said stripping station, a second outlet for discharging the lead link separated from the lead cartridge, a spring flap having a free end adjacent said stripping station, a mag well post having a generally rectangular cross-section configured to slide into a magazine well,
 a transfer mechanism operatively associated with said feed chute for sequentially moving the lead cartridge and connected lead link into the central stripping station, said transfer mechanism including a rocker frame pivotally connected to and surrounding said feed chute adjacent said inlet, said rocker frame including an upper rail and a lower rail and a left stile and a right stile, a left pivot shaft pivotally connecting said left stile to said feed chute, a right pivot shaft pivotally connecting said right stile to said feed chute, said left and right pivot shafts being co-axially aligned, at least one upper feed paw pivotally connected to said upper rail, an upper paw shaft pivotally supporting said upper feed paw, a torsion spring operatively disposed between said upper feed paw and said rocker frame, said upper feed paw having a cupped distal end extending into said feed chute from above, at least one lower feed paw pivotally connected to said lower rail, said lower feed paw having a cupped distal end extending into said feed chute from below, a crank extending from said rocker frame,
 a drive mechanism configured to produce a linear output motion, said drive mechanism operatively connected to said crank,
 a bolt catch extension, said bolt catch extension pivotally carried on said right pivot shaft, said bolt catch extension having an exterior finger grip and a pair of spaced apart legs, and
 a sheering lip disposed in said stripping station, said sheering lip configured to engage a portion of the lead link directly below the lead cartridge to resist separating forces when the lead cartridge is pushed through said first outlet with minimal induced torsional stress.

16. The device of claim 15, further including a de-linking arm extending from said sheering lip, said de-linking arm pivotally disposed together with said sheering lip in said feed chute between an elevated stripping station and a lowered non-stripping station.

17. The device of claim 15, further including a lift spring continuously biasing said sheering lip toward said stripping station.

18. The device of claim 15, wherein said sheering lip has an arcuate curvature.

19. The device of claim 15, further including an end-of-link stop, said end-of-link stop comprising a dummy cartridge having a longitudinally extending groove.

* * * * *